United States Patent
Staykoff

(10) Patent No.: US 10,015,267 B2
(45) Date of Patent: Jul. 3, 2018

(54) GENERIC MULTICHANNEL CENTER FOR NETWORK APPLICATIONS AND SERVICES

(71) Applicant: Constantin Staykoff, Sofia (BG)

(72) Inventor: Constantin Staykoff, Sofia (BG)

( * ) Notice: Subject to any disclaimer, the term of this patent is extended or adjusted under 35 U.S.C. 154(b) by 300 days.

(21) Appl. No.: 14/739,111

(22) Filed: Jun. 15, 2015

(65) Prior Publication Data

US 2015/0280983 A1 Oct. 1, 2015

Related U.S. Application Data

(63) Continuation-in-part of application No. 13/061,150, filed as application No. PCT/FR2009/001045 on Aug. 28, 2009, now Pat. No. 9,060,256.

(30) Foreign Application Priority Data

Sep. 2, 2008 (FR) ..................... 08 04815

(51) Int. Cl.
*H04L 12/24* (2006.01)
*H04L 29/08* (2006.01)
(Continued)

(52) U.S. Cl.
CPC ........ *H04L 67/16* (2013.01); *H04M 3/42382* (2013.01); *H04M 7/124* (2013.01); *H04W 4/14* (2013.01)

(58) Field of Classification Search
CPC ... H04L 67/16; H04M 3/42382; H04M 7/124; H04W 4/14
(Continued)

(56) References Cited

U.S. PATENT DOCUMENTS 6,477,366 B1   11/2002  Valentine et al.
7,010,603 B2 *  3/2006  Martin, Jr. .......... H04L 12/5692
                                        709/227
(Continued)

FOREIGN PATENT DOCUMENTS

| EP | 0986275 | 3/2000 |
|----|---------|--------|
| FR | 2857816 | 1/2005 |
| WO | 2007030413 | 3/2007 |

OTHER PUBLICATIONS

Anonymous: "Redefining over-the-phone customer service" Internet Article, Online Mar. 31, 2008, URL: http://www.voiceobjects.com/files/en/voiceobjects_7_products-brief-en.pdf.
(Continued)

*Primary Examiner* — Kevin Bates
*Assistant Examiner* — Nazia Naoreen
(74) *Attorney, Agent, or Firm* — B. Craig Killough; Barnwell Whaley Patterson & Helms

(57) ABSTRACT

A server system, where a multichannel server is connected to a core network of a mobile telecommunications network through a plurality of telecommunications channels. The multichannel server comprises a telecommunications network browser server, a network gateway, an integration gateway, a carrier application server and a carrier application and add-on studio. The multichannel server provides to end user devices network services and core network services through a plurality of communications channels. The multichannel server is an application interface gateway for services exposure and provides network services and core network services as interactive applications. The multichannel server provides application as a communication channel and communication channel as an application.

20 Claims, 6 Drawing Sheets

(51) Int. Cl.
*H04W 4/14* (2009.01)
*H04M 3/42* (2006.01)
*H04M 7/12* (2006.01)

(58) Field of Classification Search
USPC .......................................................... 709/249
See application file for complete search history.

(56) References Cited

U.S. PATENT DOCUMENTS

| | | | |
|---|---|---|---|
| 7,088,995 B2 * | 8/2006 | Rao | H04L 29/06 |
| | | | 455/410 |
| 7,370,111 B2 | 5/2008 | Callum | |
| 7,539,484 B2 | 5/2009 | Roundtree | |
| 7,720,489 B2 * | 5/2010 | Engelhart, Sr. | H04W 4/14 |
| | | | 370/352 |
| 7,756,545 B2 | 7/2010 | Roundtree | |
| 8,499,087 B2 | 7/2013 | Hu | |
| 8,554,567 B2 * | 10/2013 | Spier | H04L 65/1063 |
| | | | 704/231 |
| 2003/0139174 A1 | 7/2003 | Rao | |
| 2004/0024846 A1 | 2/2004 | Randall et al. | |
| 2007/0041525 A1 * | 2/2007 | Tingley | H04L 29/06 |
| | | | 379/88.17 |
| 2008/0064385 A1 | 3/2008 | den Hartog et al. | |
| 2008/0146204 A1 | 6/2008 | Gu et al. | |
| 2009/0061943 A1 | 3/2009 | Kamgaing-Kouam | |
| 2010/0048228 A1 | 2/2010 | Harju et al. | |
| 2012/0198475 A1 | 8/2012 | Meyer et al. | |

OTHER PUBLICATIONS

Anonymous: "USSD Services for Interactive Mobile Users—Building User-Friendly Mobile Telephony Applications Using Dialogic Distributed Signaling Interface Components," Internet Article, Online Aug. 31, 2008, URL:http://www.dialogic.com/products/docs/appnotes/11038_USSD-an.pdf.

The Moriana Group: "Service Delivery Platforms and Telecom Web Services—An industry Wide Perspective," Online Jun. 30, 2004, MAC Taylor, URL:http//www.morianagroup.com/.

International Search Report dated Feb. 22, 2010.

* cited by examiner

GENERIC MULTICHANNEL CENTER FOR NETWORK APPLICATIONS AND SERVICES

This application is a continuation in part of application Ser. No. 13/061,150, filed Feb. 27, 2011, which is the National Stage of International Application No. PCT/FR2009/001045, filed Aug. 28, 2009, which claims priority to foreign Application No. 0804815 filed in France on Sep. 2, 2008, the benefit of which is claimed hereby.

FIELD OF THE INVENTION

The present invention relates to telecommunications generally, and is more specifically directed to a generic multichannel center for network applications and services.

BACKGROUND OF THE INVENTION

In the era of new emergent technologies, is present an increasing need to conceive systems for applications and services, in particular for generic servers based on simple protocols for implementation and use, with features for interactive, intuitive, easy to use navigation (or browsing), and also with a fast integration.

To these characteristics are added the "scalability" requirements (relative to the word "scalability", which indicates the property of re-dimensioning of a system or a method respectively in term of components or steps, of quality, size, resolution, band-width or the like).

However, the constraint of the costs in material and human resources for the set-up of such systems is important. The technical problem to be solved is thus to conceive a system for applications and services, allowing with the lower possible costs, the set-up of multiple and reusable applications and services, targeting the mass market. The problem is also to fulfill the increasing requirement to have interactive compatible services between existing and emergent technologies, without expensive implementations concerning the systems for applications and services, and preferably, with little or no modification of the equipment of the telecommunications network operators, said operators (also referred to as "services providers"), of third parties and of end users. A major aspect of this technical problem is how to provide interactive services and applications with dynamic content over any communication channel, and thus, over any telecommunications network.

The present invention is positioned in the area of the conversational applications and client-server applications, more particularly in the field of the dynamic dialogues between a terminal and a server for applications and services, using interactive interfaces, giving the ability to reach, dialogue, exchange information and use different applications and services.

The present invention is positioned in particular in the area of mobile telephony, in a context of expansion of new features, addition of interactive services, convergence of the means for dialogue and communication by using multiple communication channels between heterogeneous devices, such as mobile phones, mobile equipment, digital platforms for applications and services, Internet servers, third parties services and equipment, and others.

In the present invention, the term channel refers to a device or a medium for users to reach and to use network services, and for the network operator to reach the users. A device is, for example, an access gateway and/or a network gateway and/or any gateway or a network, enabling specific protocols for interactive communication in a push and/or pull mode. A medium can be a physical transmission medium such as a wire, or a logical connection over radio waves, used to bear information signals.

In order to answer these problems, the prior art uses various approaches that address only restricted and specific aspects of these problems, without proposing complete services such as navigation in various menus, provided from various applications, use of standard protocols, or use of already available means in the devices, as standard, natively implemented functionalities without significant modification of the digital servers or the end users' equipment.

French patent No. FR2857816, relates to a method for implementation of communication, disclosing a group that includes vocal communications, WAP ("Wireless Application Protocol") or MMS ("Multi-media Message Service") on a mobile phone. In the communication method, a preliminary step consists in offering to the user the possibility to activate or not activate such communications. The choice to activate or not activate such a communication is proposed to the user by a USSD ("Unstructured Supplementary Service Data") connection. Nevertheless, the referenced document is limited to the establishment of a connection for activation via USSD of telephone voice communication, without teaching aspects of architecture, or implementation of navigation and other auxiliary services.

Another patent document is EP0986275, which relates to a method of transactions for ordering consumer items or services using a mobile phone. The order is transferred to a service provider on a mobile phone network. Some order data, in which a billing is indicated, are encapsulated in one or more short communications, such as SMS ("Short Message Service", short textual message being able to be emitted and received by a cellular phone), USSD or e-mail. These data are transmitted to a validation platform, and connected to a company central for short term communications. The cost of the indicated services is taken from a user account, and is transferred to a service provider account.

However, this document relates foremost to aspects of a specific transaction, based on existing protocols, without addressing the problems of interactive USSD navigation systems or architecture for USSD equipment in common use.

Another patent document is WO/2007/030413, which is addressed to a control channel for a VXML browser ("Voice eXtensible Markup Language", language voice extended tagging, which means an application programming interface for communication using peripheral devices related to the speech synthesis and telephony). This document focuses on a system that allows external applications to interact with a VXML browser running on a processor based on a VXML interpreter. A control is functionally positioned between the external application and the VXML interpreter using a communication channel. The control inserts into the VXML interpreter instructions which are processed by the VXML browser in a conventional manner, to allow the external application to interact with the VXML browser.

However, this document is limited to interpretation and to VXML browser capabilities and their adaptation to a transport channel with standard protocols such as UDP ("User Datagram Protocol", communication protocol providing for the exchange of a minimum of data across a network), TCP ("Transmission Control Protocol", basic protocol for exchanging data over a network), or SIP ("Session Initiation Protocol", standard protocol for initiation of an interactive network session).

Therefore, this document does not resolve the technical problem outlined in the present invention, namely, navigation in non-voice services such as USSD and others, and issues related to the specificity of the implementation and the integration of such navigation.

SUMMARY OF THE INVENTION

The present invention relates to a server system, where a multichannel server is connected to a core network of a mobile telecommunications network through a plurality of telecommunications channels. The multichannel server comprises a telecommunications network browser server, a network gateway, an integration gateway, a carrier application server and a carrier application and add-on studio. The multichannel server provides to end user devices network services and core network services through a plurality of communications channels. The multichannel server is an application interface gateway for services exposure and provides network services and core network services as interactive applications. The multichannel server provides application as a communication channel and communication channel as an application.

DESCRIPTION OF THE DRAWINGS

The present invention will be better understood with the help of the figures referring to the annexed drawings, which respectively show.

DETAILED DESCRIPTION OF THE PREFERRED EMBODIMENTS

Figure 1:
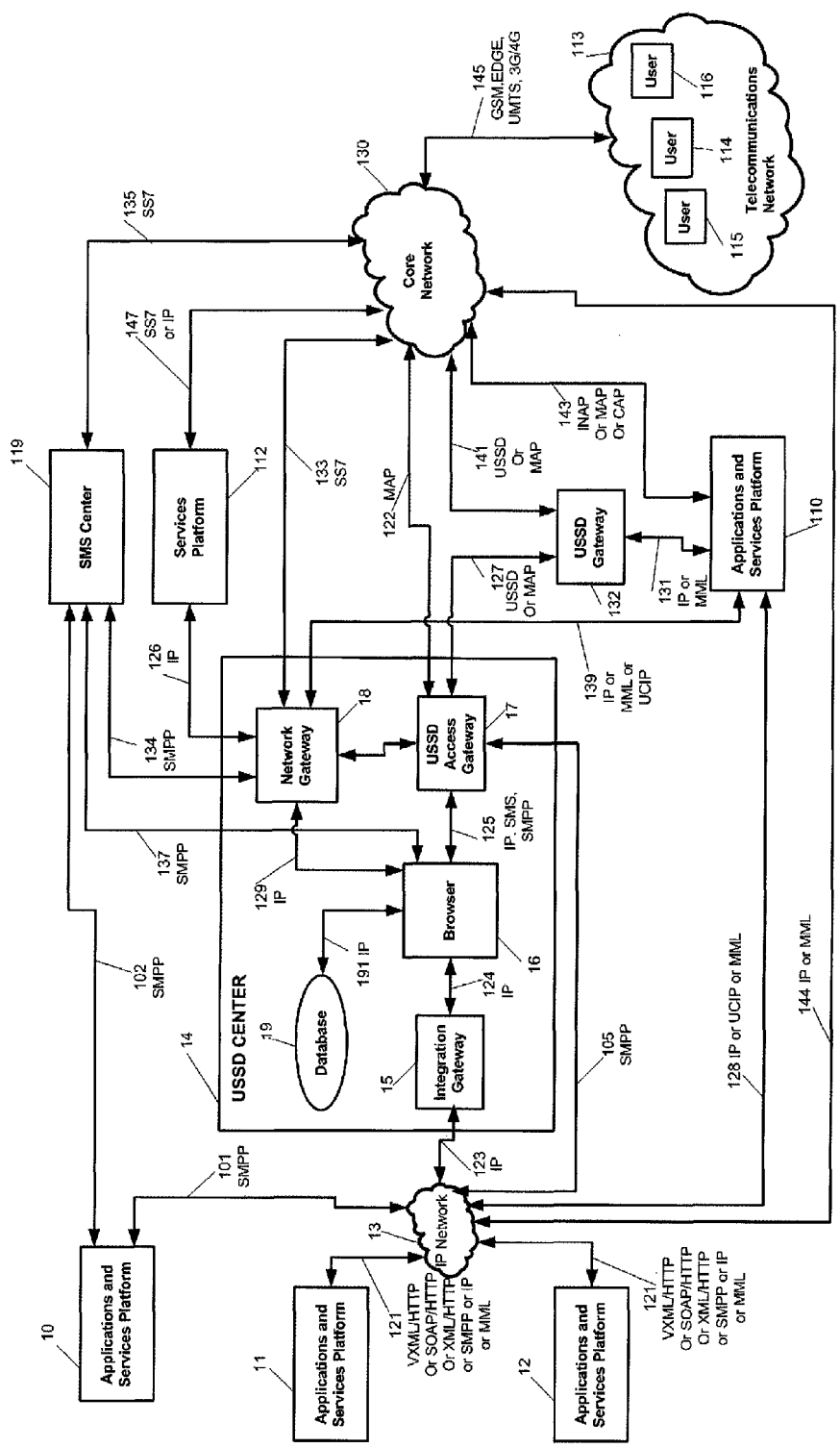
In FIG. 1, a general diagram of the architecture of the generic server system, discussed in the present invention.

The present invention relies on existing standards and protocols that are open and already implemented on devices and networks, and thus, are currently available. The invention is based on native functionality of networks and of terminals by providing a generic multichannel, multi-network, multi-application and multiservice architecture. In addition, implementation and integration is centralized on the network side, allowing optimal management of network resources and implementation efforts.

The present invention aims to solve the stated technical problem by using a unique method and a generic system for multiple applications and services, and for implementation of this method, based on the use and adaptation of network protocols such as USSD, SIP, and IP with interpreters related to structured language descriptors.

The present invention relates to a server system for network applications and services based on standard network protocols such as USSD, SIP, IP and others, containing at least one server for applications and services, including a dynamic interactive browser (or navigator) based on language interpreter(s) structured by conversational objects, such as XML, VXML, CCXML, HTML5 and JavaScript. The system for applications and services, based on a plurality of protocols, is centralized in a telecommunications or computer network, which is local or remote, and/or in a cloud. The browser, based on at least one interpreter structured by objects, is comprised in the server and is integrated into the network.

In its general meaning, the present invention relates to a digital telecommunications system for the access, navigation and use of digital applications and services, called USSD Center, and includes at least one server for applications and services module, at least one access gateway module, at least one network gateway module, at least one integration gateway module and at least one database, profiling and subscription module, the server for applications and services module, called Browser, being based on at least one USSD telecommunication protocol and on at least one module interpreter of languages structured by objects, relative to descriptors structured by objects.

Preferably:
the language interpreter is VXML or a similar interpreter
the access gateway module is based on at least one USSD protocol.

In one embodiment, the system is connected to at least one module, such as SMSC.

In another embodiment, the system is connected to at least one module such as a WAP gateway and/or OTA and/or IVR and/or GPRS for any telecommunications network.

Advantageously, the system is connected to at least one module such as SMS applications.

Preferably:
The system is connected to at least one network such as a core network for a mobile telecommunications network;
The core network is connected to at least one user network.

Advantageously, the system is connected to at least one set of networks that are based on communications protocols and interfaces.

In one embodiment, the system is connected to at least one services module of telecommunications operators, or of third parties, and/or to at least one module for mobile value-added services.

In another embodiment, the system is connected to at least one module of systems said intelligent networks and for business support.

Advantageously, at least one server for an applications and services module, or at least one access gateway module, or at least one network gateway module, or at least one integration gateway module, or at least one database and profiling module, is self-sufficient.

Preferably, the server for applications and services includes at least one VXML interpreter, at least one USSD services module, and at least one VXML files module.

In one embodiment, the USSD services module includes USSD services, unstructured or structured in menus, said USSD services being interactive or non-interactive.

In another embodiment, said services are multilingual for the whole end-to-end chain.

In a preferred embodiment, the service logic is independent of services languages for the whole end-to-end chain.

Preferably, said USSD Center includes at least one charging module, and/or at least one billing module, and/or at least one observation and ranking module.

In a first preferred implementation, the USSD Center is a network browsing system.

In a second preferred implementation, the USSD Center is as system for hosting of third parties applications and services.

In a third preferred implementation, the USSD Center is a proxy system.

In a fourth preferred implementation, the USSD Center is a router system.

In a fifth preferred implementation, USSD Center is a Broadcast distribution system.

Preferably, an administration module includes a WEB-like system administration including an environment for services creation, testing, deployment and management of versions of these services, a control module of the USSD Center, and configuration modules for features, parameters and network gateways.

The present invention also relates to a method that is performed by a step of code allocation of the USSD services, or generic; a step of creating a logic for the services; a step of testing, evaluating and versioning of the services, and a step of activating, deploying, using and saving the services.

In one implementation, this method involves an additional step of charging in real-time or offline.

In another implementation, the method also includes an additional step of billing in real-time or offline.

Advantageously, the method includes a step of convergent unification of the payment modes for all types of users (subscriber mode, prepaid mode, third party mode) of at least one telecommunications network.

Preferably, the method includes a further step of observing and ranking in real-time or offline.

In one embodiment, the method includes an additional step of distribution of data and services, such as Broadcast.

Preferably, the Broadcast distribution step is followed by a step of interactive, or non-interactive, exchange with the user.

In one embodiment, the method includes an additional step of subscribing and/or unsubscribing to at least one application.

In another embodiment, the method performs differentiation of users, the users being subscribers and/or third party applications or services, in real-time, using dynamic customization.

In a preferred embodiment, users are subscribers and/or third party applications or services that manage themselves in their own environment for creation of services, applications and content.

Advantageously, the environment for creation is accessible locally or remotely from a terminal by operators and/or third parties and/or subscribers themselves.

In a first embodiment, the method defines at least one profile of at least one user and/or of at least one service.

In a second embodiment, the method performs a detection of the user behavior and generates features for assistance and/or self-study.

In a first particular implementation, the user accesses the USSD services via existing, or new, non-USSD services.

In a second particular implementation, the user accesses the existing, or new, non-USSD services via existing, or new, USSD services.

In a third particular implementation, the user accesses the existing, or new, USSD services via existing, or new, USSD services.

In a fourth particular implementation, the user accesses the existing or new non-USSD services via existing, or new, non-USSD services.

Advantageously, several existing USSD access codes may be grouped into a single USSD access code.

In one embodiment, the method includes a step of static and/or dynamic modification of switched parameters.

In another embodiment, the method comprises a step of load sharing.

Preferably, the USSD browsing performs supply, consultation and modification of at least one type of information managed in the core network.

In its broadest meaning, the present invention relates to a digital telecommunications server system for creation, management and provision of services within a telecommunications network, which provides network services and core network services through a plurality of communications channels, such as voice, text, data, unstructured supplementary service data, WEB, applications, application add-ons and application programming interface channels. In the most general case, the multichannel server comprises a telecommunications network browser server, a network gateway platform that, an integration gateway, a database comprising profiling information for services and for users, a carrier application server comprising carrier application and add-on database, and a carrier application and add-on studio platform.

The general scheme of the present invention is illustrated in FIG. 1. A server platform for applications and services (14), called in the present invention "Center for applications and services" or also "Center" is designed to perform and to bill services, for example, such as messaging (USSD or SMS "Short Message Service", or other), such as "Browsing", i.e. navigation, such as "Hosting" and such as "Broadcast", i.e. distribution of data from a single source to a set of receivers.

The Center (14) server system is a generic open platform, multichannel, multi-network, multi-application and multi-service, which provides services compatible with standard protocols used in mobile networks and devices, such as, for example, SS7 ("Signaling System 7" telecommunications protocol for high bits rate connections in circuit mode) and/or SIP and/or IP protocols ("Internet Protocol").

In the present invention, the term "platform" is a set of hardware and/or software components located in a telecommunications network. The platform provides services and/or tools and/or data and performs required processing. The platform is able to communicate via communication channels and protocols with servers, and/or devices and/or telecommunications networks.

In the present invention, the term module generally refers to a separable component of a platform designed to perform a particular set of tasks.

In the present invention, the term "Multichannel generic system" means a system based on standard protocols, existing or new, enabling implementation of any service and any existing or new application by using plurality of communication channels. Center (14) is shown as located within a server in a network, such as a mobile telecommunications network, SS7 network, 3G/4G network, IMS network, LTE network, NGN network ("Next Generation Networks", designated as any future telecommunications network), Internet computer network or any other digital network. In a first embodiment, Center (14) consists of five main modules: a server for application and services (16) with a browser, called herein "Browser" (16), or Browser (16) being based, for example, on at least one USSD protocol, an USSD access gateway (17), a networks gateway (18) based on protocols compatible with telecommunications networks, an integration gateway (15) dedicated to information technology systems information, and a data, profiling and subscription database (19).

In a general example, Center (14) server has at least one server for applications and services (16), at least one access gateway (17), at least one network gateway (18), at least one integration gateway (15), and at least one data, profiling and subscription database (19).

In a first particular case, the Center includes a subset of modules (16), (17), (18), (15) or (19).

In a second particular case, at least one module (16) or at least one module (17) or at least one module (18) or at least one module (15) or at least one module (19) is self-sufficient.

In the present invention, a gateway is a platform, or a set of intermediate platforms, which processes and transmits information packets on a network or on multiple networks to the specified destination, and allows heterogeneous networks to communicate. The term "network gateway" is a gateway to any network, including at least one network interface.

The integration gateway (15) communicates with the server for applications and services (16), said Browser (16), via a link (124), and using at least one interfacing protocol, for example, an IP standard protocol.

Standard IP protocol is the set of IP protocols used in the networks. The Browser (16) communicates with the USSD access gateway (17) via a link (125) and using protocols, for example, IP or SMS applications protocol, such as SMPP ("Short Message Peer to Peer"). The Browser (16) communicates also with the network gateway (18) via a link (129), using standard IP protocols, for example. The Browser (16) exchanges data with the data and profiling database (19) via a link (191) using protocols such as IP. The data and profiling database (19) contains information, for example, white lists and black lists regarding various users, user profiles, services profiles and various usage statistics, such as those used in analysis and service management. The module (19) also includes modules for static or dynamic definition of at least one user profile and of at least one service profile.

Subsequently, in a first architecture embodiment, said Center (14) as implemented, may be the USSD Center (14).

The USSD Center (14) may be connected through the USSD gateway (17) to a network such as "Core Network" (130) ("Core Network", basic central network or core of the telecommunications network). The Core Network is, for example, a core network for GSM ("Global System for Mobile telecommunications"), for GPRS ("General Packet Radio Services", a communications system with access using packet services), for EDGE (Enhanced Data rates for GSM Evolution), UMTS ("Universal Mobile Telecommunications System"), 3G/4G, for IP Multimedia Subsystem (IMS), for LTE (Long Term Evolution) and/or any other core network, such as for NGN. For instance, the network (130) may utilize SS7 and communicate with the USSD Center (14) via a link (122) through which communications are exchanged, for example, using MAP protocol ("Mobile Application Protocol", protocol for mobile applications).

In another implementation, the USSD Center (14) is connected to the network (130) through the network gateway (18), via a link (133), and using one or more protocols, such as SS7.

For example, the link (133) may consist of a CAP protocol ("CAMEL Application Part", application part protocol of CAMEL protocol "Customized Applications for Mobile network Enhanced Logic"; allows a telecommunications operator to provide, inside or outside of its own network, special services to its users, such as real-time billing), a INAP protocol ("Intelligent Network Application Protocol", application part for intelligent applications on SS7 protocol) or a MAP protocol.

The core network (130) may include different elements or modules with which the network gateway (18) and/or the USSD Access gateway (17) exchange data. For example, for an SS7 core network, these modules may include HLR modules ("Home Location Register"), MSC modules ("Mobile Switching Center", center for mobile communications) or MSS ("Mobile Softswitch Server"), SSP (Service Switching Point), VMSC modules ("Visited Mobile Switching Center", visited center of mobile services), GMSC modules ("Gateway Mobile Services Switching Center", switched mobile services gateway), SIGTRAN modules (set of protocols defined for transporting SS7 messages over IP) or any other modules or platforms specific for the core of a telecommunications network relating to mobile telephony. For example, in an IMS core network, the predominant elements may be HSS ("Home Subscriber Server"), MSS and CSCF ("Call Session Control Function") with sub-elements Proxy CSCF, Interrogating CSCF and Serving CSCF. For an LTE core network called Evolved Packet Core (EPC), also known as SAE ("System Architecture Evolution") Core, main elements may be MME ("Mobility Management Entity"), MSS, SGW ("Serving Gateway"), PGW ("PDN Gateway"), HSS ("Home Subscriber Server"), ANDSF ("Access Network Discovery and Selection Function") and ePDG ("Evolved Packet Data Gateway").

The core network (130) may exchange information via a link (145), with a network (113) having a set of users (114), (115), and/or (116). The network (113) is a mobile telecommunications access network, for instance, RAN ("Radio Access Network", the radio access network for mobile phones) for GSM and EDGE, UTRAN ("Universal Terrestrial Radio Access Network") for UMTS and 3G/4G, E-UTRAN ("Evolved UTRAN") for LTE or for example such as PSTN ("Public Switched Telephone Network"), NGN, or any other digital access network with a set of users. The communication link (145) is set up using standard protocols such as typical GSM, EDGE, UMTS, 3G/4G, IMS and/or LTE and or VoIP protocols.

The user equipment, called also terminal or device, is, for example, a mobile phone (or cell phone), a PDA ("Personal Digital Assistant", handheld computer combining multiple functions), a multi-function board computer or a device for vehicle, home or business having multi-platform capability, including, for example, monitoring or safety functions, or any other fixed or mobile device that is able to communicate with at least one network.

In the present invention, the term "user" is an individual subscriber (or end user), fixed, nomadic or "Roamer" ("roamer", in the sense of "roaming" between networks) to at least one network, or telecommunications networks operators, called also "services provider", or a third party provider of applications, of services, of contents or of any equipment; for example, alarm or signaling equipment, or a developer of applications and/or of services.

The network gateway (18) may be connected to a services platform (112) via a link (126), and using protocols such as IP. The services platform (112) is, for example, WAP gateway, OTA ("Over The Air", standard protocol for transmitting and receiving information relating to an application for mobile phones), IVR ("Interactive Voice Response"), LBS ("Location Based Service", location services module based on network cells identification) or GPRS (for instance MMSC "MultiMedia Messaging Service Center", multimedia service center). This platform (112) is also connected to the telecommunications core network (130) via a link (147) and using standard or specific protocols, for example, SS7 or IP. The network gateway (18) is also connected to a module (119) which may be a SMSC (SMS Center) of a telecommunications operator, via a link (134), and using protocols such as SMPP. The SMSC module (119) is itself connected to the telecommunications core network (130), via a link (135), using communications protocol such as SS7.

Preferably, the Browser (16) is also connected to the SMSC module (119) via a link (137) and using protocols such as SMPP. In this case, the USSD services are also offered as SMS services. Also, The USSD services are offered as services WAP, IVR, OTA, GPRS or 3G/3G+.

A third party module (10) for processing of SMS applications treats the SMS queries and communicates in a conventional manner with the SMSC module (119) via a link (102) and protocols such as SMPP.

In a particular implementation of the USSD Center (14), the application SMS queries of the module (10) are transmitted via links (101) and (105) with protocols such as SMPP, and are processed directly by the USSD access gateway (17), allowing these external SMS services to be available in USSD.

Also, other existing non-USSD services such as IVR, OTA, WAP, GPRS or 3G/3G+ are available via USSD. In general, using this architecture, the user accesses the USSD services via non-USSD services, existing or new, and also the user accesses the non-USSD services, existing or new, via USSD.

The USSD Center (14) is connected via a link (123), which may be IP, to a set (13) of IP networks which include various protocols, linked to platforms for applications and services (10), (11), (12) and (110). Through this set of networks (13), the USSD Center (14) has access to platforms (12), for example, VAS ("mobile Value-Added Services"). Data between this set of networks (13) and the platform (12) are exchanged via the link (121) using standard protocols, such as for example VXML/HTTP ("HyperText Transfer Protocol" text transfer protocol), SOAP/HTTP ("Simple Object Access Protocol", standard protocol for the VVWVV services ("World Wide Web" or "WEB", global network), XML/HTTP ("XML", "eXtended Markup Language", extended markup language for describing and analyzing data), SMPP, or using proprietary protocols such as ORACLE® (server for interface and applications for mobile chain), MySQL® (relational database), LDAP ("Lightweight Directory Access Protocol"; simplified protocol for accessing databases), Diameter (IP extension for mobile, intended to provide an Authentication, Authorization and Accounting (AAA) framework for applications such as network access or IP mobility), RADIUS (IP extension for mobile), MML ("Man-Machine Language") or other kinds of protocols.

Preferably, the integration gateway (15) communicates directly with platforms for applications and services (10), (11), (12) and (110) using, for example, VXML/HTTP, SOAP/HTTP, XML/HTTP, SMPP, MML, Diameter, LDAP or UCIP protocols.

According to one implementation through the IP network (13), the USSD Center (14) has access to a platform (11), such as an ASP platform ("Applications Service Providers"; third party providers for applications and services) or third party SDP ("Service Delivery Platform") or Internet platform, or MVNO ("Mobile Virtual Network Operator") platform, or other third party platforms such as banks, with which the USSD Center (14) exchanges information via a link such as (121) directly or through the network (13).

In a particular embodiment, a portion of the set of IP networks (13) is connected with one or many platforms of the network (130) via for example an IP link (144), such as MML or TELNET ("TELecommunication NETwork"; network protocol to remotely execute controls). This is an effective and practical way for the USSD Center (14), to propose, via browsing, the supply, the consultation and the modification of the information managed in the core network (130), and by default, inaccessible to users.

In one embodiment, the network (130) has access to the service platform (110) such as OCS ("Online Charging System"), OSS ("Operational Support System") or BSS ("Business Support Systems") via a link (143) using protocols such as INAP, MAP, CAP and CDR ("Call Data Records"; recording of the call data). The BSS module (110) is, for example, a post-paid billing module or a prepaid billing module, such as IN ("Intelligent Network"; concept defining advanced functions driving the equipment of the phone network) platform.

The platform (110) is also connected via a link (131), using specific or proprietary protocols, to a gateway (132), which is, for example, USSD gateway dedicated to modules such as BSS. The gateway (132) communicates with the core network (130) via a link (141) using the USSD or MAP protocol and with the USSD access gateway (17) via a link (127) using the USSD or MAP protocol. In this case, the link (127) is merged with any link, such as (141). This particular connection makes it possible to configure the architecture of FIG. 1 for new services.

In a particular embodiment, the platform (110) exchanges information with the network (13) via a link (128), using standard or proprietary protocols, specific to the platform (110), such as for example « Ericsson » ® UCIP ("User Communication Integration Protocol", « Ericsson » ® specific protocol), « Huawei » ® MML, the applications protocol "Corba" for NSN ((« Nokia Siemens Network » ®) BSS, Corba for « Alcatel » ® BSS, or Corba for « LHS » ® BSS. In another embodiment, the platform (110) is directly connected to the network gateway (18) via a link (139), using standard or specific protocols such as IP, MML or UCIP for example.

The generic architecture described herein is not intended to be limiting by the example comprising the modules and the links illustrated in FIG. 1, which presents a dynamic and interactive system for the access and the use of multiple applications and services by the users of at least one telecommunications network (113). Using this architecture, new services are offered to users through classic interfaces, such as USSD, SMS, IVR, WAP, GPRS, 3G/4G or LTE. In addition, an USSD access is opened to users for existing classic services, such as SMS, IVR, WAP, GPRS, 3G/4G or LTE.

Also, classic and hard to use networks features such as call forwarding, Roaming functions ("roaming", inter-network roaming), short numbers, callbacks and others are made convenient and easy to use thanks to the USSD Center (14). In addition, real-time services are offered, such as differentiation of a user in roaming mode, and appropriate dynamic customization and profiling.

Advantageously, supplementary platform modules, such as (10) (11), (12) or (110), of telecommunications operators or of third parties are added. In this way, the architecture shown in FIG. 1, including the module USSD Center (14), the network (13) and the platform modules (11), (12) and (110), have properties of scalability adapted to the capacity of information processing in terms of channels, data, applications, services, networks or others.

The USSD Center (14) manages the applications and the services according to the network resources, and plans the routing of each task according to the available channels, the available bandwidths or of the queries, requesting additional resource allocations.

In a particular embodiment, telecommunications operators have access to this architecture to perform operational and load testing of external systems. The USSD Center (14) therefore offers the possibility for connections and for testing of additional modules. Preferably, all connections of the USSD Center (14) to external systems are based on pre-requisites for security of these systems. The exchanges are unsecured or secured using, for example, encryption, such as SSL ("Secure Socket Layer"; a protocol that encrypts data sent by a browser, or the like).

The present invention is detailed below with preferred embodiment examples that are not intended to be limiting.

In a preferred implementation, the Browser (16) is based on USSD protocol and on a structured VXML language interpreter.

Figure 2:
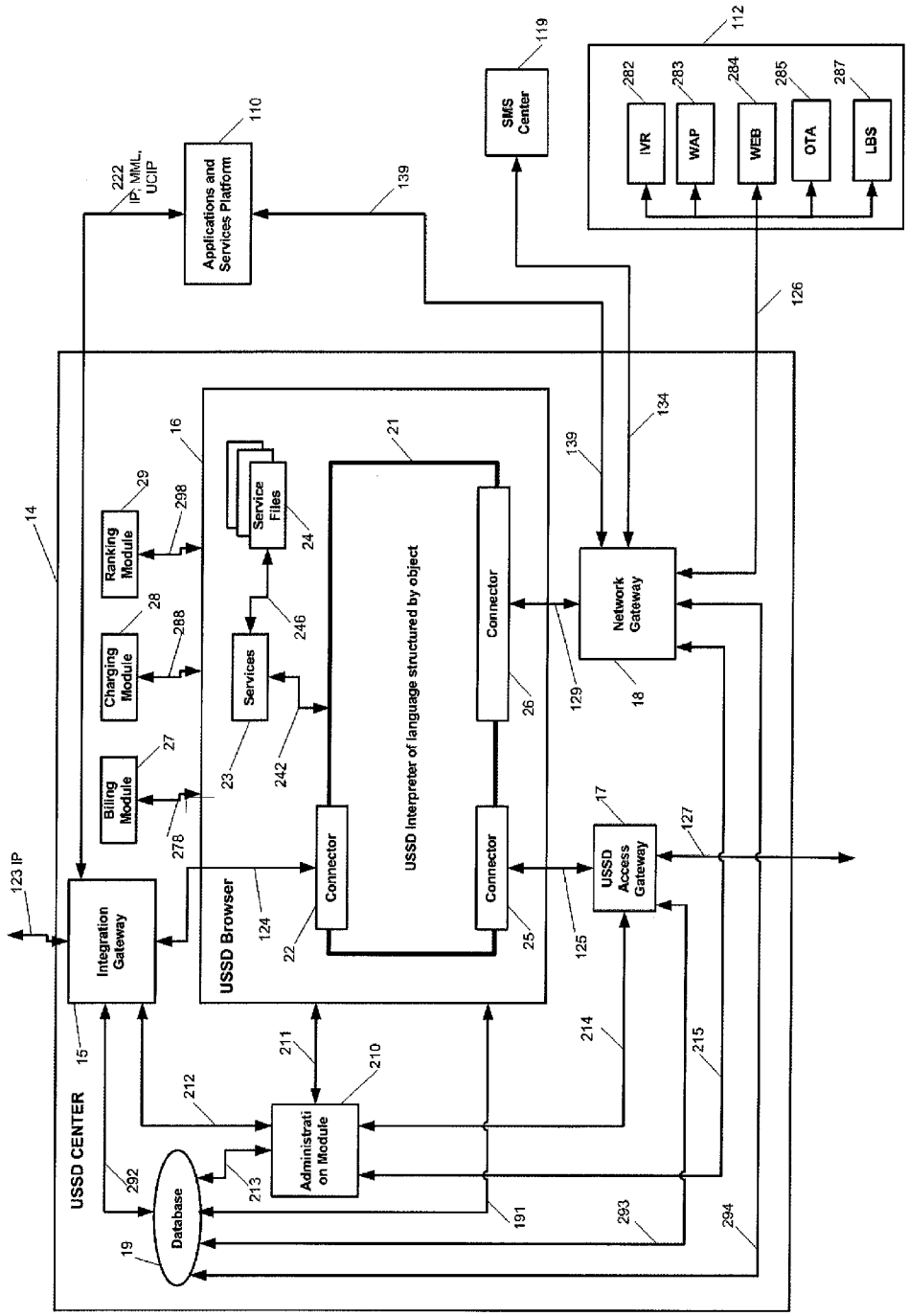
In FIG. 2, one particular embodiment of the generic server system, called USSD Center (14) and of the Browser module (16) with its internal connections.

An example of a preferred embodiment of the module Browser (16) is shown in FIG. 2.

The Browser (16) includes at least one interpreter of language structured by object (21). In this preferred example of implementation, the interpreter (21) is VXML. The VXML interpreter (21) exchanges information with a module (23) containing lists of services or USSD menus, via a link (242) and using protocols such as VXML. USSD menus are unstructured or structured. At least one given service is described using a call of VXML files (24) via a link (246) and using VXML protocol, in order to identify the context and the properties of the communication with each user of mobile phones. In this case, the Browser (16) is based on VXML.

In this way, navigation is performed through menus such as USSD. All USSD services of the module (23) are deployed in the browser as VXML files (for example VoiceXML v2), and downloaded into the memory of the VXML interpreter (21). Preferably, the VXML interpreter (21) is designed to take into account the specifications of the USSD protocol communication. The VXML interpreter (21) uses internal virtual memories (or "caches") for previously interpreted queries, and thus all queries interpreted for the same USSD sequence are performed without navigation, i.e. without a new interpretation of the already explored tree structure.

In a first preferred embodiment, the Browser (16) is configured as a browser. The browsing logic is similar to that of a WEB browser. Configuration interfaces indicate lists and sub-lists of all principal existing services and applications. These lists and sub-lists are respectively called pages and sub-pages or menus and submenus.

For example, USSD service codes are generated and assigned to menus. In one embodiment, the USSD service codes are assigned to all menus. In another embodiment, the service codes are assigned to some of the menus.

Preferably, the menus (23) represent at least one USSD page, these USSD pages being linked with a browsing logic. The menus are enabled or disabled, for example by an internal administrator module (210), called Services and Logic Management (SLM) module (210) and their state is indicated in the USSD Center (14) with configuration messages stored in the data and profiling database (19).

The browsing method, including generation, allocation and management of menus, may be defined by several steps:

Allocation of the USSD service codes; In cases where existing USSD service codes are not assigned in advance, temporary USSD codes are generated by the SLM module (210).

Creation of services logic, including definition of nodes and sub nodes, programming of the marking variables, and definition of remote URLs ("Uniform Resource Locator");

Testing, evaluation and versioning of the services;

Activation, deployment and use of the services.

The Browser (16) allows browsing to be performed from a main menu in sub-menus, with direct access through an USSD string, creating a "shortcut" that includes a sequence of user responses towards the USSD screen to modify deployment.

For example, a simple USSD sequence may be:

123*1*2#

The Browser (16) interprets each parameter of the USSD string of the user in a sequential way and then displays the appropriate menu. In the case where the menu is a last node, the Browser (16) sends a query, such as by HTTP, to the third party service provider, which provides as feedback the desired content.

Using the Browser (16), dynamic operations are set up and performed. These operations include navigation with feedback, navigation from a main menu, navigation from an intermediate menu, and browsing interruption. Advantageously, these operations may be accompanied by analysis capabilities, configuration and backup of the user profile. The term "user profile" is the set of characteristics relating to at least one connection and to at least one session. For example, the user profile may include: IP address, phone number, location, time and date of the connection, duration of the connection, language of the connection and of the browsing, geographical location, types of required applications and services, required contents, and any other characteristic related to the connection.

Preferably, the USSD Center (14) contains a multilingual menu configuration for the whole end to end chain (between the final subscribers and the service providers (operators) or the third party services providers, for example). Also, the services logic is independent of the languages for the whole end to end chain.

The Browser (16), as designed, is configured for a network architecture with connections, which is multiple, dynamic and interactive. This Browser (16) includes internal connectors, for example, communication interfaces with gateways (15), (17) and (18). These internal connectors may include at least one sub-connector. By using the connector (22), the Browser (16) communicates with the integration gateway (15) via the link (124). The Browser (16) is also connected to the USSD access gateway (17) via the USSD connector (25) and the link (125). Also, the Browser (16) communicates with the network gateway (18) via the connector (26) and the link (129).

In a particular embodiment, the network gateway (18) is connected to the platform (112) via a link such as (126), specifically with modules such as IVR (282), WAP (283), OTA (285), LBS (287) and WEB (284). In this way, services such as IVR, WEB or WAP are proposed via USSD protocols. In general, any digital service, and any new or existing application for networked systems is set up by USSD protocols.

In another particular embodiment, the network gateway (18) is connected with the services platform SMSC (119) via the link (134). The integration gateway (15) exchanges data with the BSS platform (110) via a link (222) which, as shown, is a composition of link (123), network (13) and link (128). Also, the networks gateway (18) exchanges data with the BSS platform (110) via the link (139), using protocols such as IP, MML or UCIP. In a first implementation example, the module (110) is connected only to the integration gateway module (15). In a second implementation example, the module (110) is connected only to the network gateway module (18). In a third implementation example, the module (110) is connected to the integration gateway module (15) and to the network gateway module (18).

The data and profiling database (19), comprising a module for defining of at least one user profile and at least one service profile, separately exchanges information with the integration gateway module (15) via a link (292), with the module Browser (16) via the link (191), with the USSD access gateway module (17) via a link (293) and with the network gateway module (18) via a link (294). In this manner, configuration information, various administration data, statistics and information about users and services profiles are completed, and used and inter-exchanged between the gateways modules (15), (17) and (18) and the Browser (16).

In a particular embodiment, the data and profiling database (19) is connected only with the Browser (16) via the link (191), in which case the links (292), (293) and (294) are omitted. Preferably, the data and profiling database (19) contains information on the characteristics of sessions, including static and dynamic statistics.

In a second preferred embodiment, the Browser (16) is configured as a "Hosting" platform, or hosting of applications and of external or third parties services. Third parties securely access creation features and activation for applications and services. Third parties codes only for the services they offer.

The hosting embodiment of the present invention allows telecommunications operators to implement USSD in order to set up services operated by third parties, such as service providers. Third party access is secure. Telecom operators create one or many accounts for each third party by attributing at least one access code and USSD resources. Each third party services provider uses the same user interface as the telecommunications operator and operates remotely its own USSD application within operating limits assigned by the telecommunications operator. A history of activities and operations for each third party services provider is recorded. Furthermore, this creation environment for services and applications is provided not only to third parties services providers, but also to various users, such as developers of applications and services, and subscribers, who adapt and customize own applications, services and contents.

In a third preferred embodiment, the USSD Center (14) is configured as a USSD "proxy" (module of a USSD system connected to another USSD system and performing queries (and their backup) for service needs). This embodiment concerning, for example, the module (110) is achieved via the specific USSD gateway (132). The classic link (141) connecting the USSD gateway (132) to the core network (130) is then merged by the module (110) with the link (127) connecting the gateway (132) to the USSD Access gateway (17). The applications and services of module (110) are then appropriated by the USSD Center (14).

In this way, grouping of several USSD access codes in a single access code is possible. Also, new services (USSD or not) may be introduced by the operator, which would not otherwise be achievable without modification of the existing core network and network elements.

In a fourth preferred embodiment, the USSD Center (14) is configured as an active routing platform, which provides USSD-like mediation between different core network elements, and solves problems related to routing of users, services and applications. These problems are, for example, routing of the user towards a BSS platform (110), routing such as MNP ("Mobile Number Portability") and others.

When the USSD Center (14) performs the functions of proxy and of router, it has the ability to make static and/or dynamic changes on switched parameters. When the USSD Center (14) performs the functions of proxy and of router, it has the ability to perform load sharing functions.

In a fifth preferred embodiment, the USSD Center (14) is configured to perform distribution, such as distribution of Broadcast data and services to multiple users, such as broadcasting advertising, alerts or useful information. In one implementation, the Broadcast distribution is followed by a response from the user and by an interactive exchange, for instance, applications such as consumer enquiries and surveys.

Moreover, a Broadcast services creation environment allows services providers, third parties services providers, developers and the end user to adapt and to customize their own Broadcast distributions.

Advantageously, the Broadcast environment of the USSD Center (14), also enables the operators to launch traditional broadcast services, such as SMS, IVR, WAP, GPRS, 3G/3G+ or LTE.

In an embodiment example of the USSD Center (14), the Browser (16) communicates via a link (278) with a billing module (27). In this way, the contents requested by the same user are generally subject to a control and to billing in real-time or offline.

In another embodiment example of the USSD Center (14), the Browser (16) communicates via a link (288) with a charging module (28).

Both embodiments are applied to various kinds of users, such as: postpaid with subscription, prepaid mode, roaming, fixed or nomadic.

The USSD Center (14) manages, for example, the billing with subscription or in prepaid mode, by using an approach called external payment procedure. A specific procedure for external billing is specified in the USSD services logic during the creation of the service, and is triggered in real-time during the user session. The payment procedures are in accordance with the specific payment procedures of an operator or of a third party.

During the session, a mobile user in roaming is identified, so that his or her navigation is appropriately taken into account during the payment procedure. Advantageously, this feature is available through the use of USSD Center (14) functionalities.

In general, the USSD Center (14) includes a payment system that applies charging and/or performs billing in real-time or offline, and therefore allows the convergence of the different services and modes of payment (prepaid, with subscriptions and mixed).

In a particular embodiment example, end users subscribe to any service using the USSD Center (14). Preferably, the USSD Center (14) includes a feature to change or to automatically cancel the subscription, either pursuant to a request of the user, a request of the operator or a request of the third party services provider.

In one particular implementation of the USSD Center (14), the Browser (16) communicates via a link (298) with a module (29), for which a method of observation and ranking is defined. Preferably, said method of observation and ranking makes the observation, the analysis and the ranking of the users' behaviors, of the contents, of the services, of the suppliers and of other users, either in real-time or offline. This method is used, for example, for the analysis and ranking of the services and requested subparts, and for income generation. The observation and ranking parameters are defined during, or after, the process of the service creation.

During the session, network management administration is performed by the SLM module (210), which may be internal to the USSD Center (14), and which generates in real-time the required parameters, and automatically creates an observation and/or ranking event.

In one embodiment example, the billing module (27), the charging module (28) and the observation and ranking module (29) are integrated within the Browser module (16). The SLM module (210) of the USSD Center (14) is connected with the Browser (16), and therefore, with the VXML interpreter (21) via a link (211). The SLM module (210) is able to simultaneously support all of the deployed services, including USSD generic operations initiated by the telecommunications network and the mobile terminal, as well as sessions or dialogue of a bilateral USSD session. The observation and the ranking are applicable to the service provider, the third party services provider, and the end user. The observation is based on defined parameters and criteria, for example: the type of the event, the date and time of the event, the duration of the session, the number of exchanges during the session, the application code of the service (end user or any network), the VAS provider, the message content (based on keywords or content codes), and the location of the end user. Also, a combination of observation factors may be correlated with events phenomena, such as, for example, holidays, sports championships, and advertising campaigns.

In its most general definition, the SLM module (210), includes a WEB-like system management environment, including a WEB environment for creation of services logic and of channel logic, for creation of services, for testing, deployment, management, orchestrating and providing of services and of versions of these services, a control module of the whole server system USSD Center (14), and modules for the configuration of the features, parameters and all network gateways. Said environment for services creation is accessible by the operator and/or by the third parties and/or by the users themselves either locally, remotely or from a terminal. The SLM module (210), also performs connections control, data collection and analysis, and statistics. The SLM module (210) as shown is connected with at least one other internal module of the USSD Center (14), other than the Browser (16). The SLM module (210) is, for example, connected with the integration gateway (15) via a link (212), with the USSD access gateway (17) via a link (214), with the network gateway (18) via a link (215), and with the data and profiling database (19) via a link (213).

The data and profiling database (19) provides the USSD Center (14) with the ability to determine in real-time the profile of a user or of a group of users. The user profile is completed by its usage profile relative to at least one service and to a set of parameters specific to the sessions for this service. By using the data and profiling database (19), the USSD Center (14) has the ability to determine in real-time the profile of a service or a set of services. This profile consists of information such as, for example, the lack of accessibility for the free services or for a particular group of users, the definition of white and black lists, or others.

Applying detected user behavior, the USSD Center (14) has the ability to trigger an event for assistance through self-learning. Thus, the USSD Center (14) delivers, in real-time, assistance adapted to the user when necessary. In one embodiment, the USSD Center offers management of services and of contents performed directly by users. For example, the services and the contents are created or customized by the individual user using a WEB site or directly using the mobile terminal.

Preferably, the USSD system for browsing and for hosting generates CDR files. Once created, for instance, the files for billing are available for the telecommunications operator or for the third parties services providers. The frequency of updating of these files is, for example, at least once per minute. Their format is, for example, such as "ASN.1 Structured" ("Abstract Syntax Notation One Structured", standard way for describing a message sent or received by the network).

In one particular implementation, the CDR files syntax is adapted by the telecom operator and some parameters are modified. The various CDR formats are generated using preset parameters. For each node in the tree of the service logic, the choice of CDR formats, and their uses by an administrator, is flexible. Said administrator may be an operator, a third party services provider or any third party to whom the administration of the services has been delegated.

Figure 3:
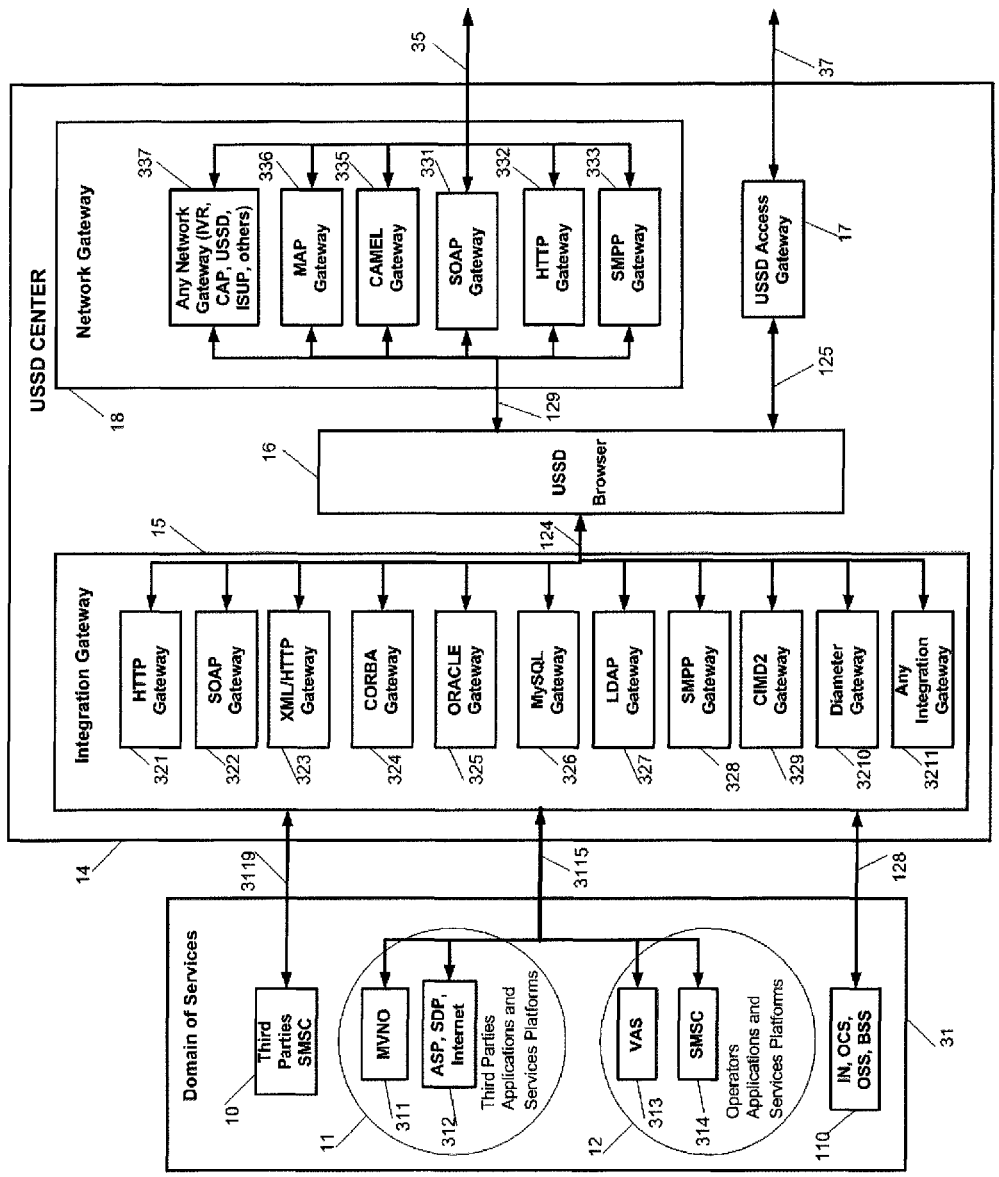
In FIG. 3, one particular embodiment of the USSD Center (14) with external connections of the Browser module (16)

FIG. 3 illustrates a non-limiting embodiment example of the architecture referenced in FIG. 1 and FIG. 2 with external connectors to the Browser module (16). The Browser module (16) is represented in architecture with the integration gateway module (15), which includes at least one integration interface module. Preferably, the interface modules, called "gateways" are based on protocols such as HTTP (321), SOAP (322), XML/HTTP (323), CORBA (324), «ORACLE» ® (325), «MySQL» ® (326), LDAP (327), SMPP (328), CIMD2 (329) ("Computer Interface to Message Distribution, version 2", distributing messages interface), Diameter (3210), or any integration gateway (3211). In the integration gateway module (15), integration interfaces may be client, server, client-server or "Peer to Peer", point to point, communication. Also, the module (15) as shown is connected via a link (3115) which is a combination of links s (123) and (121), with a module (31) comprising a set of services, for example, VAS services. The module (31) includes, for example, the module (11) which contains a MVNOs module (312) and an ASP module (311), and includes the module (12), which includes a telecommunications operator VAS module (313) and of a SMSC module (314). The integration gateway module (15) communicates with the modules (11) and (12) via a link such as (123), followed by a link as (121).

The module (31) also includes a service platform such as OCS, OSS, BSS or IN (110), with which the integration gateway module (15) communicates via a link such as (128). Also, the module (31) includes an SMS applications platform (10), with which the integration gateway module (15) communicates via a link (3119) which is a combination of links (123) and (101). In order to access multiple computer and telecommunications networks, the Browser module (16) is connected to the networks gateway module (18) via a link such as (129). The module (18) contains at least one network gateway such as SOAP (331), HTTP (332), SMPP (333), CAMEL (335), MAP (336) or any network gateway (337). In the network gateway module (18), the network interfaces are such as client, server, client-server or "Peer to Peer", point to point communication.

The network gateway module (18) has access to networks, for instance via a link (35) which is, for example, (133) and/or (126) and/or (134) and/or (139), and/or via a link (37), which is, for example, (127) and/or (122) and/or (105).

With the unique and non-limiting architecture illustrated in FIG. 3 of the present invention, the generic USSD Center (14) presents characteristics of a multi-applications and multi-services system, having compatibility and interoperability with existing systems, scalability in terms of networks performances and connections and, therefore, in terms of number of applications and services.

The USSD Center (14) is an open platform that is adapted to existing standards with multi-services and multi-operator capabilities. The USSD Center (14) enables the deployment of new services, providing opportunities for multiple mobile applications. User interaction with mobile applications is easy and instantaneous, the response time is guaranteed and interactions during the session are supported, unlike services such as SMS and GPRS. The USSD protocol is fully supported by the GSM and subsequent networks, and the addition of the USSD Center (14) in a telecommunications core network does not require modification of the network. The USSD Center (14) supports sessions initiated by the user (115) such as "pull" ("pull", withdrawal) and sessions initiated by the applications server (16), the Browser (16), such as "push" ("push", pushing), with unilateral or bilateral interactivity.

Using a simple reconfiguration, mobile applications such as SMS, STK ("SIM Tool Kit"), WAP, IVR and others, are immediately available. Since the USSD access gateway (17) and the USSD Browser (16) are open platforms, integration of different networks protocols and multiple deployments over various channels and heterogeneous networks with capacities of several thousand transactions per second is enabled.

For example, the USSD Center (14) may be used for banking services and applications, for Broadcast distribution, such as advertisements, alerts, traffic simulation and various network services. Also, the USSD Center (14) is used for content management by geographical location, as well as for the multitude of emerging applications of third party service providers. Telecom operators have access to this USSD Center (14) to test external systems functionally and loaded. Additional modules are integrated, such as modules comprising supervisory or security functions, or any other fixed or mobile device that is able to communicate with at least one telecommunications network.

A particular and non-limiting embodiment of the USSD Center server module (14) is performed using hardware platforms such as HP («Hewlett Packard»®), FSC («Fujitsu-Siemens Computers»®), IBM («International Business Machines»®) or «SUN Microsystems»®. The operating system is, for example, systems such as «Red Hat Enterprise»® or «Fedora Linux»®, or such as «Sun Solaris»®.

In a second preferred architecture embodiment, said Center (14) when extended to handle multiple communication channels is called Multichannel Center (14).

Figure 4:
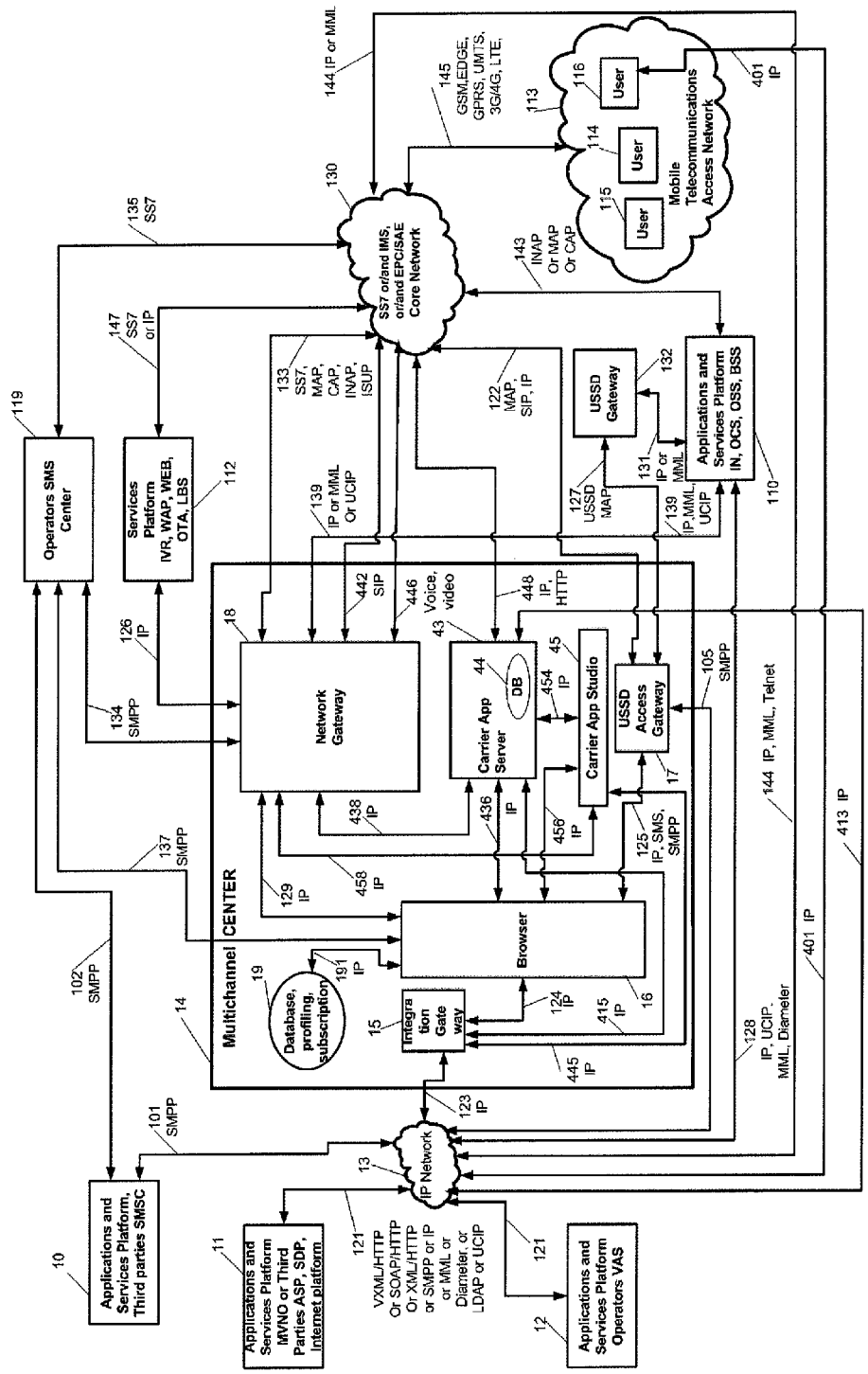
In FIG. 4, a general diagram of a particular multichannel architecture of the generic server system, discussed in the present invention.

The implementation of the general architecture of the generic Multichannel Center (14) and its positioning in the telecommunications ecosystem is presented in FIG. 4. This embodiment relates to multichannel and multi-network architecture of the Multichannel Center (14) which comprises additional modules such as a "carrier application and add-on" studio (45) and a "carrier application" server (43) comprising a "carrier application and add-on" database (44). The Browser (16) as shown communicates with the carrier application and add-on studio (45) via a link (456), using protocols such as IP. Respectively, the Browser (16) communicates with the carrier application server (43) via a link (436) using protocols such as IP. The integration gateway (15) communicates with the carrier application server (43) via a link (415) using protocols such as IP and with the carrier application and add-on studio (45) via a link (445) using protocols such as IP. The Network gateway (18) communicates with the carrier application server (43) via a link (438) using protocols such as IP and with the carrier application and add-on studio (45) via a link (458) using protocols such as IP. Preferably, the network gateway (18) comprises a SIP gateway and a Media gateway and thus communicates with the core network (130) via a link (442) using protocols such as SIP and/or via a link (446) using protocols such as RTP (Real-time Transport Protocol) protocol carrying voice or video contents. The carrier application server (43) communicates with the core network (130) via a link (448) using protocols such as IP or HTTP, carrying HTML contents for example.

According to this architecture, the Multichannel Center (14) provides or enables multichannel delivery of services through the core telecommunications network (130) which is SS7 and/or IMS (IP Multimedia Subsystem) core network and/or EPC/SAE core network. Thus, the core network (130) delivers network services and core network services from the Multichannel Center (14) to the terminals of end users (114), (115) and (116) of the mobile telecommunications access network (113) via the link (145) and using protocols such as GSM, EDGE, GPRS, UMTS, 3G/4G and/or LTE.

In the present invention, the term "link" is a functional link or a communication channel used to depict the particular embodiments and/or method steps and used by the modules to communicate each other with compliant input/output protocols for data exchanges and processing in the scope of the disclosure. Intermediate network layers, channels and protocols of the telecommunications networks are not disclosed with specificity, since the structure and operation of such intermediate layers and protocols are within the knowledge of one skilled in the art.

The Multichannel Center (14) is preferably located in a core network (130) of the mobile (or cellular) telecommunications network and/or communicates directly with telecommunications core network elements of the core network (130). In a particular implementation, the Multichannel Center (14) is located in any telecommunications network, local, remote in a cloud or other, and communicates directly with the core network (130) elements.

In one embodiment, the mobile terminals of the users (114), (115) and (116) are inside of the coverage of the mobile telecommunications access network (113). In another embodiment, the mobile terminals of the users (114), (115) and (116) are outside of the coverage of the mobile telecommunications access network (113) and are in the coverage of another mobile telecommunications network. In a particular embodiment, the mobile terminals of the users (114), (115) and (116) are inside of the coverage of a telecommunications network, which is not a mobile telecommunications network, and which is different from a mobile telecommunications access network, for example, a telecommunications network which may be, for example, an IP network (13), an Internet network, a LAN (Local Area Network), which communicates via Wi-Fi (Wireless LAN) protocol, WiMax (Worldwide Interoperability for Microwave Access) protocol and other protocols.

Figure 5:
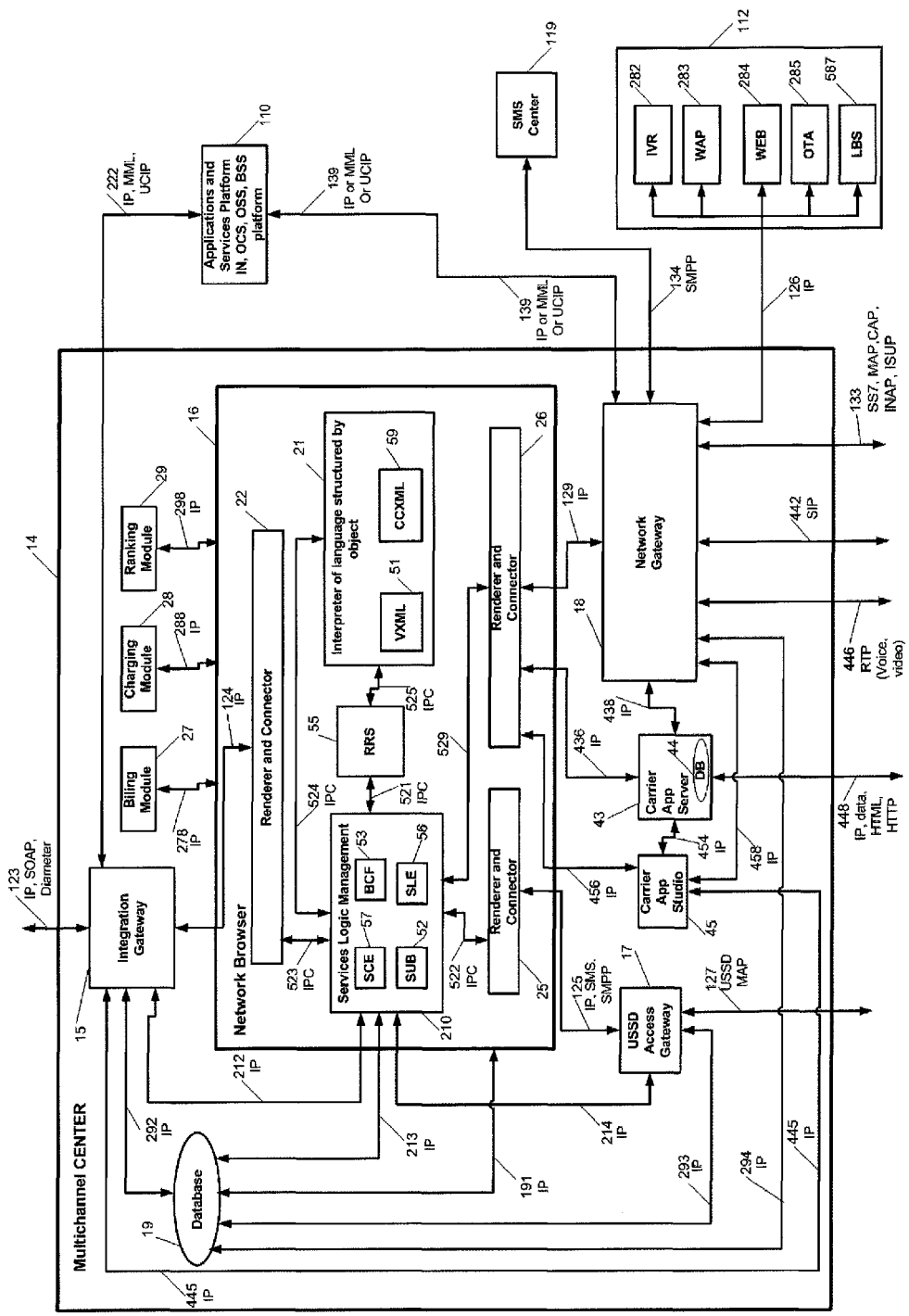
In FIG. 5, one particular embodiment of the generic server system, called Multichannel Center (14) and of the Browser module (16) with specific internal architecture.

Another example of a preferred embodiment of the module Browser (16), also called network Browser (16), is shown in FIG. 5. In this implementation the SLM module (210) is located, for example, inside the network Browser (16) and performs service logic, channel logic and services creation in a SCE module (57), management and providing of services, control and synchronization of all modules of the Multichannel Center (14). Advantageously, the SLM module (210) runs the service logic into the network Browser (16) and deploys the channel logic into the integration gateway (15) and/or into the network gateway (18) and/or into the network Browser (16).

In a preferred embodiment, the SLM module (210) comprises a Service Creation Environment (SCE) module (57), a Business Configuration (BCF) module (53), a Subscription (SUB) module (52) and a Self-Learning (SLE) module (56).

The Browser (16), in charge of services generic logic elaboration, comprises the module (21) Interpreter of languages, structured by objects such as XML and/or VXML and/or CCXML (Call Control eXtensible Markup Language) and/or XCAP ("XML Configuration Access Protocol") and/or HTML5 and/or JavaScript (Programming-language that enables developers to easily design webpages and add interactive feature), and/or any language structured by objects. Preferably, the module (21) comprises sub-browser modules or sub-browsers, each sub-browser being related to at least one language structured by objects, for example, VXML sub-browser module (51) and CCXML sub-browser module (59). The Browser (16) comprises also a RRS (Ready to Run Services) module (55), which is a server comprising a database platform with stored and already defined services, parts of services, information and instructions for services management. The RRS module (55) communicates with the Interpreter module (21) and the SLM module (210), respectively, via links (525) and (521), using IPC (Internal Protocol for Communication) protocol, such as IP for example. The SLM module (210) communicates via a link (524) using an IPC protocol with the Interpreter module (21) in order to manage service logic, channel logic and services implementation. The SLM module (210) communicates with the internal connectors modules (22), (25) and (26) respectively via links (523), (522) and (529) using IPC protocol. Preferably, the Connectors modules (22), (25) and (26) have Renderer sub-modules or sub-platforms, performing contents and formats adaptations for services exposure to the external platforms and to end user terminals compliantly to terminal's characteristics, such as screen size, power and processing capabilities, supported multimedia formats and others. Advantageously, the Renderer sub-module of the connector (26) transforms one service presentation format to another. For example, the connector (26) formats an USSD menu into specific pages, and/or reformats header and/or transcodes USSD format to HTML format, to WML (Wireless Markup Language) format, or to IVR format or to other channel specific formats. In one embodiment, the transcoded formats are sent directly to the end user terminal. In another embodiment, the transcoded formats are sent to the carrier application and add-on Studio (45) via the link (456). Thus, the user chooses format representations according to service requirements for the end user.

Preferably, Renderer sub-modules of connectors (25) and (22) perform contents and format adaptations for services and applications exposure to external third party platforms such as (10), (11) and VAS platform (12), for example.

Preferably, the SCE module (57) comprises three main service logic processing platforms, a first platform for preprocessing, a second platform for main processing and a third platform for post-processing of the service logic of a service. The second platform for main processing performs a core of a service logic and channel logic for different communication channels related to this core of the service logic. The first platform for preprocessing and the third platform for post-processing perform processing, which is not directly related to the core of the service logic. For example, the first platform for preprocessing performs a logic for the end user profiling and the third platform for post-processing performs logic for subscription of the end user.

The BCF module (53) allows design and deployment of end user marketing and commercial options. The BCF module (53) is integrated with the service logic by a business configuration software bus, and allows external business configuration to be accounted by service logic without software development. A business logic software bus allows the BCF module (53) to hook into the service logic conceived in the module SCE (57), in the three service logic processing platforms, said first platform for preprocessing, second platform for main processing and third platform for post-processing of the service logic. This architecture allows, for example, the service logic to account in real time specifics chosen by the end user or by the user's business configuration.

The SUB module (52) allows design and deployment of end user subscriptions, and management of various subscription options, such as recurrent payment cycles with calendar billing, or one-time billing; for example, a specific period (week or weekend), or billing per volume of data, or other specific business configurations. The SUB module (52) allows the mobile operator to define, without further software development, how end users can sign-up or sign-out at any time for desired business configurations. For example, the SUB module (52) has the ability, in case of an exhausted end user subscription, to automatically enroll a subscription renewal, or to offer in real-time other adapted end user options defined in the BCF module (53). The SUB module (52), as the BCF module (53), is integrated with the service logic conceived in the module (57), communicating with its three main service logic processing platforms: the first platform for preprocessing, the second platform for main processing and the third platform for post-processing of the service logic.

The self-learning SLE module (56) offers proactively or during renewal, appropriate business configuration and subscription options to end users. The module analyzes activity logs of end users, and tracks all deployed business configurations and subscription options.

Advantageously, each of the SCE module (57), BCF module (53), SUB module (52) and SLE module (56) has an appropriate GUI (Graphical User Interface) for configuration of services without additional software development.

The SLM module (210) also provides GUI for additional tools, such as:
environment of control, of logic, of switching and of orchestration of services,
environment of testing, of deployment and of version control of services.

Preferably, the GUIs are typically designated for non-technical users, for example, teams of the telecommunications network operator, such as a marketing team, a products team, a services team and/or a commercial team.

The architecture of the Multichannel Center server (14) performs creation, integration, aggregation, management, deployment, activation, orchestration and delivery of core network services and of network services, and thus provides such services via a plurality of telecommunications channels to the core network (130) and to the services and applications platforms (10), (11), (12), (110), (119) and (112).

Preferably, the Multichannel Center (14) performs creation, integration, aggregation, management, deployment, activation, orchestration and delivery of interactive core network services and of interactive network services and provides such services via a plurality communications channels to the equipment of the end users (114), (115) and (116). Thus, the Multichannel Center (14) provides interactive communication to end user devices by delivery of network services and core network services through a plurality of communications channels.

Figure 6:
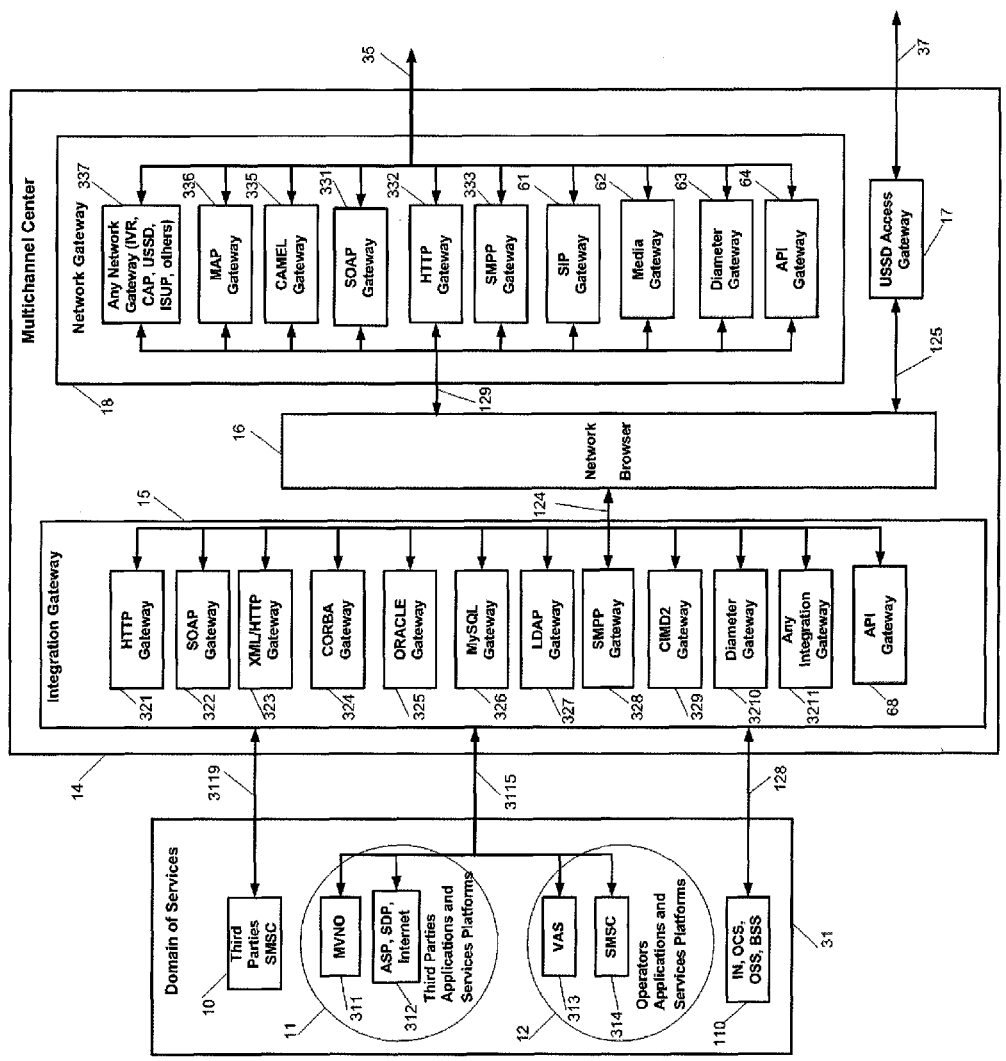
In FIG. 6, one particular embodiment of the Multichannel Center (14) with external connections of the Browser module (16) and particular gateways.

FIG. 6 illustrates a non-limiting embodiment example of the architecture referenced in FIG. 4 and FIG. 5 with additional external gateways to the Browser module (16). Advantageously, network gateway (18) comprises a SIP gateway (61), a Media gateway (62), a Diameter gateway (63) and an API gateway (64). API stands for "Application Program Interface", a set of set of instructions, functions, operations, configurations and protocols which can be used directly, without adaptation or software development when implementing new functions and services providing from various platforms. The API offers predefined functions to interact with heterogeneous platforms and devices, instead of conceiving such functions case-by-case. These gateways communicate with the network Browser (14) via the link (123) using protocols such as IP, and with the core network (130) via the link (35) using protocols such as MAP, USSD, SIP, Diameter, IP and/or other standard or specific protocols. Preferably, the integration gateway (15) comprises an API gateway (68) communicating with external platforms such as (10), (11), (12) and (110) by using protocols such as IP and/or other standard or specific protocols.

The SIP gateway (61) and the Media gateway (62) are mediators between the network Browser (16) and the telecommunications mobile operator's core network (130) elements and platforms, such as a core network (130) of an IMS. The SIP gateway (61) and/or the Media gateway (62) allow the service logic in the Browser (16) to communicate, for example, with an HSS and/or a MSS core network element by performing protocols translation and combination, for example, adaptation of messages from SS7 ISUP and/or MAP and/or CAMEL protocol to SIP protocol. For example, the service logic of services performed initially on USSD and/or SMS remains the same, while the SIP gateway (61) performs protocols conversions, tunneling, encapsulations and/or combinations. Preferably, USSD service logic is provided to IMS core by incorporating an approach such as USSI (USSD Simulation Service for IMS).

Media gateway (62) also may comprise various content encoders and decoders for transcoding of contents and adaptation to external systems formats; for example, for services platform IVR (112) or for the core network (130) elements. Media gateway (62) supports voice protocol such as G.711 (a-law/u-law) and voice formats such as WAV (Waveform Audio File Format), ADPCM (Adaptive Differential Pulse Code Modulation), AMR (Adaptive Multi Rate), Clear Channel (format related to dynamic codec with dynamic payload type for a VoIP platform), video formats such as H.263, H.264 and many others. Thus, the Media gateway (62) interprets services script received from the network Browser (16) and executes transcoding and consecutive commands, for example, displaying a textual menu and waiting for a textual response, or sending a voice menu and waiting for a DTMF (Dual-Tone Multi-Frequency Signaling) response. Preferably, contents processed by the Media gateway (62) and exchanged with the core network (130), such as DTMF, are processed by the SIP gateway (61) and carried over SIP protocol via the link (442).

In the present invention, a "service" is typically a set of network and of system processing actions that follow a user interaction. The network and system processing actions provide data processing, storage, presentation and communication, including at least one request-response by the user's terminal and the mobile telecommunications network, and are usually implemented using a client-server architecture based on telecommunications protocols. Data so provided comprises information and/or instructions, which are structured or unstructured, and also comprises objects with information and/or instructions. Objects may be, for example, objects of structured language by objects such as XML, VXML, CCXML, HTML, JavaScript (a programming language commonly used in WEB developments) and others, and/or binary objects with digital data with different specific formats.

In the present invention, an "application" is typically a framework for services exposure to a user, which is also an access point to the user of the services. Preferably, an application is presented in a graphical and interactive form, comprising graphic and/or textual elements. An application is typically embedded or downloaded in the mobile terminal of the user. In another implementation, one or more applications are located in a remote server and are accessed remotely by the mobile terminal. An application may also act as a navigator (or a browser) for accessing the services. An application may also act as navigator (or a browser) for other applications.

When services are written from a user, for example, a telecommunications network operator, a third party or a developer of applications and services, they are interpreted by the CCXML sub-browser module (59) and/or by the VXML sub-browser module (51) and stored as services in the RRS module (55). The CCXML sub-browser (59) and the VXML sub-browser (51) communicate via the link (525) with the RRS module (55) for object exchanges and handling.

The SLM module (210) also performs supervision, control and synchronization functionality for the whole Multichannel Center server (14), namely, for the telecommunications Browser (16) modules CCXML sub-browser (59) and VXML sub-browser (51). The SLM module (210) performs control functionality and configuration of parameters for the network gateway platform (18), the integration gateway platform (17) and the database, profiling and subscription platform (19).

The SLM module (210) of the Browser (16) runs and executes the services logic and deploys the channel logic in the integration gateway (15) and/or in the network gateway (18) and/or in the network Browser (16).

In the present invention, an integration gateway, as a network gateway, is a platform comprising a set of intermediate gateway platforms, as depicted in FIG. 6. The intermediate gateways perform processing, transmitting signaling and data packets on a network, or on multiple networks, to at least one specified destination.

The structure in FIG. 6 allows the network Browser (16) to communicate with heterogeneous networks elements and thus provides interactive multichannel communication to users and devices.

Additionally, the integration gateway (15) and the network gateway (18) run the channel logic elaborated by the SLM module (210). In a particular embodiment, the integration gateway (15) and the network gateway (18) perform channel logic.

"Channel logic" relates to complex protocol processing (conversion, combination, modification, tunneling, encapsulation/decapsulation, extension) and adapting of services objects to protocol complexity, which may be indispensable for interactive communication on a channel through a network or a core network (130). Preferably, the Multichannel Center (14) performs a plurality of channel logic, while keeping the service logic identic, network protocols and formats remaining unchanged.

The network gateway (18) is preferred to comprise several gateway modules, as depicted in FIG. 6. Each gateway module may perform a variety of tasks. For example, an IVR-type gateway provides notification of a call recipient for reverse billing, a CAP-type gateway may be used for reversing the billing in real-time, a MAP gateway provides real-time retrieval of information related to the calling and called party (such as location, type of prepaid or post-paid billing, and others), an USSD gateway is used to trigger the service over USSD, and others. In general, the network gateway (18) comprises many gateway modules for channel logic implementation, for protocols adaptation and for communicating with external and internal modules. Advantageously, the network gateway (18) comprises many additional gateway modules such as SIP gateway (61), and Media gateway (62), in order to communicate with the core network (130) elements, Diameter gateway (63) and API gateway (64) for communicating with platforms such as BSS (110), SMSC (119) and LBS (287) of the module (112), for example. Advantageously, two or more gateways of the network gateway (18) and/or of the integration gateway (15) may be used for channel logic implementation. For example, charging services for an LTE core network are exposed using Diameter protocol and SIP signaling.

The integration gateway (15) comprises, for example, many gateway modules such as HTTP gateway, SOAP gateway, «ORACLE» ® (server for interface and applications for mobile chain) gateway, «MySQL» ® (relational database) gateway, SMPP gateway, Diameter gateway and API gateway (68), which provide communication with external to the Multichannel Center (14) platforms such as (110), (11), (12) and (10) via the link (123).

In a preferred embodiment, network gateway (18) and integration gateway (15) are merged in a unique gateway platform.

The Multichannel Center server (14) provides services which are generally and natively performed by the core network, called "core network" services, such as those native services typically implemented by the telecommunications operators, for example, those services related to call control and switching based on the call signaling processing, authentication, charging, aggregation of flows to be processed by the core network (130), gateways for the core network to access other networks, support of Operations Support Systems (OSS) to configure and provision the core network elements, Intelligent Network (IN) providing and support for many OSS and BSS (110), host and maintenance of subscribers database, for example in the HLR and in VLR elements of the core network (130). In one embodiment, the Multichannel Center (14) system intelligence is distributed among the SLM (210) module of the Browser (16), the integration gateway (15) and the network gateway (18), with both gateways performing a channel logic. Thus, the protocols complexity impact on services and on protocols parameters management is exported in the integration gateway (15) and/or in the network gateway (18). For example, for implementation of a roaming SMS notification service, channel logic about visited networks connections and location management of the roamer are performed in the network gateway (18) and are transparent for the service logic related to SMS notifications.

In another embodiment, the SLM module (210) performs the service logic and the channel logic, runs the service logic in the network Browser (16) and deploys the channel logic in the integration gateway (15) and/or in the network gateway (18). This approach leads also to a de-correlation of the service logic from the gateway and channel complexity and offloads the service logic processing.

Advantageously, at least one channel logic is executed in the SLM module (210) of the Browser (16). In this case, the core network (130) and the network (113) have the ability to provide conventional functionalities covered by the network gateway (18) and the integration gateway (15), respectively.

A particular implementation in the Multichannel Center (14) is the API gateway (64). For example, a BSS platform (110) provides a typically limited number of native APIs, each having an important data output. Using an API gateway (64) allows segmentation of the BSS (110) APIs as per service logic needs, reducing processing complexity and channel traffic, and helping to avoid channel congestion and alteration of real time services delivery.

Advantageously, the API gateway (64) runs at least one configurable combination of channel logic, of service logic and of protocol objects for navigation in the core network (130) elements, such as MSS or HSS, or others.

Preferably, the API gateway (68) runs at least one configurable combination of channel logic, of service logic and of native APIs in platform such as (10), (11), (12) and/or (110) and provides services exposure from such platforms (10), (11), (12) and/or (110) to end users (114), (115) and (116). Thus, network services are exposed via configurable APIs.

In a preferred implementation, the Multichannel Center (14) acts as an API gateway between an operator core network (130), then between an end users network (113), and third party applications and services platforms (11). In another embodiment, the Multichannel Center (14) acts as an API gateway between operator applications and services platforms (12), (110), (112), (119) and between third party applications and services platforms (11) and/or third party SMSC platforms (10).

In yet another embodiment, the Multichannel Center (14) is an API gateway between a third party application and services platform (12), such as MVNO platform (311), and another third party application and services platform (11), such as ASP (312). The API gateway feature of the Multichannel Center (14) allows easy configuration via the business configuration platform (53) and fast deployment of business-to-business services exposed to multiple channels, subscribers and assets.

The API gateway embodiment of the Multichannel Center (14) provides smart and user friendly exposure of desired communications channels for the different users.

The Multichannel Center server (14) provides classical core network services such as:
 services related to call control;
 switching based on call signaling processing;
 authentication;
 aggregation of flows processed by the core network;
 gateways for the core network that access other networks;
 support of operations support systems;
 support of business support systems;
 support of online charging systems;
 configuration and provision of core network elements;
 support of intelligent networks;

host and maintenance of subscribers databases;
real time charging and billing services, for example, prepaid billing for roaming Mobile Originating SMS service;
multi-triggering for Mobile Originating Call and Mobile Terminating Call, for voice and SMS calls;
incoming and outgoing Call Control;
Service Control Point (SCP);
reverse billing;
USSD callback.

The Multichannel Center server (14) also provides additional complex core network services, such as:
complex services provided by a core network of a mobile telecommunications network related to complex call control;
services control points with CAMEL proxy SCP for visited CAMEL networks;
complex charging and billing, for example with customization;
virtual services for calling;
call completion;
call screening and filtering;
campaigns management;
recharge services;
multi SIM (Subscriber Identity Module) management;
mobile virtual private number (VPN);
new mobile number attribution;
subscription, unsubscription and renewal management;
virtual mobile numbers management;
cells broadcasting of services;
services management in roaming (callback, unbundling, collect call, customized notifications, and others);
location services based on cells identification;
real-time management and renewal of exhausted data plan.

In a preferred embodiment, the Multichannel Center (14) replaces at least one element of the mobile telecommunication core network (130), the Multichannel Center (14) performing one or many functionalities of the mobile core network elements.

Core network services are also used as a basis to enable other network (or users) services and applications. Network or users services are specific services, and in general, are end user oriented:
Services often having complex call control and/or complex billing, which are not provided by the telecommunications operators, for example, many of the services related to the platforms IN (110) and ASP (11);
Services called value-added services (VAS), which are also known as non-core network services, for example, services that are related to the platform VAS (12);
Internet services, for example, services related to an Internet platform (11).
Network services are, for example, charging and billing, call filtering, Location Based Services (LBS), "infotainment" services, music or video streaming downloads, mobile phone backup, ring back tones, mobile advertisement, mobile payment, mobile voting, Internet services and many others.

The Multichannel Center (14) provides network services with complex call control and/or complex billing services, for example, mobile collect calls, intelligent call screening, data roaming, community charging services and location based broadcast advertisement.

The Multichannel Center server (14) also offers classical value added services, as services provided from a VAS platform (12), and services provided from an ASP and/or Internet platform (11).

Moreover, the Multichannel Center (14) provides functions and support for third party providers and for telecommunications operators, and for network services implementation, provision and exposure, such as:
API Interfacing gateway between external services platforms (11), (12) and (10) and the core network (130).
Proxy platform for IN platforms, for messages and signaling;
Routing platform, which provides mediation between different core network elements and solves network issues related to routing of users; for example, routing of prepaid or postpaid users to an IN platform (110), mobile number portability routing, load sharing functions and other functions.

Advantageously, the Multichannel Center (14) replaces at least one element of the set of core network (130) elements. Thus, the Multichannel Center server (14) is located within the core network (130). A preferred embodiment is a realized method for charging and billing of a large community of subscribers (potentially consisting of hundreds of subscribers) implemented using the Multichannel Center (14). This mobile community service called CCS ("Community Charging Service", community pricing and billing service) allows telecommunications operators to manage the sessions of communities of significant size. Unlike friends and family community-oriented services for small groups of subscribers, this service allows the management of hundreds of thousands of users, whether post-paid or prepaid or mixed mode subscribers. For example, an ICS ("Intelligent Call Screening") service is implemented for outbound roamers with an automatic call filtering and call routing functions. This service includes the management of CCS blacklists and whitelists, and many other features. This CCS service can be deployed into core telecommunications network (130) such as a non-intrusive routing gateway and as a Proxy for an IN platform, and is configured as proxy intervening only when negotiating CCS calls. The Multichannel Center platform (14) with its CCS service uses a processing logic appropriate to the community and routes the calls to an IN platform (110). In this exchange, the CCS service designates the index of appropriate pricing used by the IN platform (110). Thereafter, the IN (110) continues the CCS call control directly with the core network (130). This is possible due to the ability of the Multichannel Center (14) to place itself in the core network (130). The advantage of this implementation is the possibility of quick enabling of flexible new core network services, while leaving the critical part of continued call control to the IN (110) and to the core network (130).

In order to perform services logic, a method is defined and implemented in the Browser server module (16). "Service logic" is consecutive operations that implement a service: processing steps, collection of needed data, establishment of links between platforms, servers, devices, modules and elements, data/languages conversions, request-responses interpretation and processing, and communications management with external systems and telecommunications networks.

Consecutive steps performed by the Multichannel Center (14) for service creation, management, implementation and provision are, for example:
Creation of a service as service objects in the SCE (57) of the SLM module (210) by using object structured languages, for example XML and or VXML and/or CCXML and/or JavaScript;

Creation of a service logic for combining and sequencing of service objects by using a logic tree with nodes and branches and combinations of VXML and CCXML objects in accordance with the service complexity. For example, when consecutive operations have to be performed and links between nodes and operations have to be defined, VXML language may be used. VXML has a request-response (or synchronous) entity and is well adapted for the service processing steps description and integration. For example, VXML is used for the description of steps required for the communication between platforms, for the data exchanges with external services and applications platforms or, for the display of end users menu on the mobile phone screen. Different processing steps can be described with different VXML files. Each VXML file is considered, for example, as an "object". CCXML entity is asynchronous and is used for event handling and state machine representation. Services, including calls, are defined with CCXML; for example, a service for reverse billing or a service for charging a voice call. Another example is when the core network (130) has CAMEL gateway and a third party service is provided by Diameter protocol; thus, the service logic is preferably written in CCXML.

The VXML sub-browser module (51) and the CCXML sub-browser module (59) are used during service logic creation in accordance with service complexity. For example, if only USSD menus are used to define a service, VXML for VXML sub-browser module (51) is used. If the service is complex, such as Reverse Billing, the USSD menu is preferably written in VXML and a B-party subscriber list allowing reverse billing is also written in VXML. The call control part, comprising call connections, establishment and release of the B-party subscriber to an A-party subscriber, is written in CCXML and is interpreted by the CCXML sub-browser module (59).

Creation of a channel logic for different communication channels related to the service logic;

Integration and interpretation of the service logic into the telecommunications network Browser (16):
  Interpretation by the Browser (16) of telecommunications protocols embedded in the integration gateway (17) and in the network gateway (18) modules and used for service implementation;
  Processing of the service objects in a CCXML sub-browser (59), based on a CCXML language interpreter, extended to support telecommunications protocols, such as SS7, MAP, CAP, ISUP (Integrated Services digital network User Part, part of SS7), SOAP, IP, HTML, CAMEL, SIP, Diameter or others.
  Processing of the service objects in the VXML sub-browser (51), based on a VXML language interpreter, extended to support telecommunications protocols, such as SS7, MAP, CAP, CORBA (Common Object Request Broker Architecture), Diameter or others;
  Exchanges of service objects between the CCXML sub-browser (59) and the VXML sub-browser (51);
  Generation of service object extended with protocols and thus producing of "protocol objects";

Deployment of the channel logic in the network gateway (18) and in the integration gateway (15);

Communication between the telecommunications network Browser (16) module (16) and the network gateway platform (18) using protocol objects;

Communication between the network gateway (18) and the mobile telecommunications core network (130) elements using protocol objects;

Implementation of the service and provision of the service to users by "browsing" or "navigation" in the core network (130), resulting in provisioning, consultation, interaction, and modification of information in the core network (130) elements, and transfer of services information through a set of mobile telecommunications core network (130) elements.

The core network navigation or browsing may perform the following steps and functions:
  Consultation of prior information, such as data, parameters, addresses, links and other information managed in the elements of the core network (130);
  Provisioning of this prior information to the modules SLM (210), CCXML sub-browser (59) and VXML sub-browser (51) of the network Browser (16);
  Interpretation of the prior information by the modules of the network Browser (16);
  Defining instructions and other information for core networks (130) elements, performed by the SLM module (210), on the basis of interpreted prior information and in accordance with services requirements and services logic defined by the SLM module (210);
  Preparing instructions and other information, which may contain data, parameters, links and other information, for elements of the core network (130), which are, by default, inaccessible from the users;
  Supplying the core network (130) elements with instructions and additional information.

Any service and/or any application of the Multichannel Center server (14) may be implemented by the method described herein. The processing of the service objects in the sub-browsers (51) and (59), is extended to support telecommunications protocols, produce protocol objects and the listed particular method steps, and provide services adapted to specific content requirements, transport channels, network capacities, systems compliance and communication channels capabilities. The services logic for a service is created once, and the service is automatically adapted to any communication channel by running an adapted channel logic.

In a preferred embodiment, network services and core network services are implemented as applications. The Multichannel Center (14) may also provide applications, in which a plurality of services is embedded. In one embodiment, an application comprises services embedded as add-ons. In another embodiment, services are standalone applications. In this way, the Multichannel Center (14) provides to mobile terminals of end users (114), (115) and (116) services and/or applications, either defined by the telecommunications operator, for example, by using the SLM module (210), or provided by third party platforms such as (11).

In order to allow efficient and effective implementation of applications while considering delay, costs, ease and ergonomics, the Multichannel Center (14) comprises the module carrier application server (43) for services deployment and delivery. The server (43) preferably comprises a module carrier application and add-on database (44) with software components for providing representations of the services, and the module carrier application and add-on studio (45) platform for defining visual presentation, layout arrangement, and packaging, and for linking the services with associated representations. A representation of a service is, for example, an icon, a picture, a widget and/or any visual presentation comprising graphic and/or textual and/or interactive components or similar indicia. The carrier application and add-on studio platform (45) is an environment that provides tools for services visual representation creation, testing and deployment, and which packages services for a mobile device of end users (114), (115) and (116) as standalone applications, or as add-ons in applications. Preferably, equipment of the end users (114), (115) and (116) has an embedded client module called "carrier application and add-on" client module, which is able to communicate with the carrier application server (43) via protocols such as IP, HTTP, data and/or with the network gateway (18) via protocols such as USSD. Thus, the carrier application and add-on client module embedded in the terminal of the end users (114), (115) and (116) receives, decodes, interprets and formats received services and applications from the Multichannel Center (14) and displays them on the terminal screen of the subscribers (114), (115) and (116) by using user friendly interactive graphical user interface.

The carrier applications server module (43) is preferably a processing platform for receiving queries from the mobile terminal of the end users (114), (115) and (116), for processing queries with modules in the Multichannel Center (14) and for preparing and sending of the required responses to the mobile terminals. The carrier application server (43) communicates with the Network Browser (16) for services execution, retrieval, adaptation and delivery. The carrier application server (43) can also execute services or portions of services, and communicates with the network gateway (18) via the link (438) using IP protocol, for example. The carrier application server (43) thus performs network and core network services retrieval, execution, adaptation and delivery.

For example, an application layout presenting services as graphic icons is displayed on the screen of the mobile terminal of the end user (114). The subscriber (114) clicks on a service icon, then a query for this service is sent from the mobile terminal to the carrier application server (43) using IP protocol, for example. When receiving a request (or an invocation) for the service, the carrier application server (43) sends, for example, a request to the RRS module (55) of the network Browser (16) via the link (436) using an IP protocol. In this example, the requested service is executed by the RRS module (55) in the modules CCXML sub-browser (59) and/or VXML sub-browser (51), and the received service response is retrieved back to the carrier application server (43). The service response is then provided via the link (448) using IP protocol to the mobile terminal of a user (114) and the response representation is displayed on the screen of his (her) mobile terminal.

In one implementation, when the end user (114) requests a service, this service is packaged by the carrier application and add-on studio (45) as a standalone application with only one service, and it sends a request to the carrier application server (43) to obtain the layout of the service. Following the user (114) request, or automatically based on events, such as mobile terminal timer or a received call or notification from the network, such as for subscription expiration or any other event, the carrier application server (43) executes an initializing network services command, prepares a response comprising a page or pages of content, and sends the response to the carrier application and add-on client embedded in the terminal of the end user (114).

In another implementation, the carrier application and add-on client embedded in the terminal of the user (114) sends an incoming request requiring navigation in network services, then the carrier application server (43) redirects via the link (436) the request to the network Browser server (16), receives a response, reformates the response in a layout page and sends the page to the terminal of the user (114).

Different components with information and patterns for layouts, pages, add-ons and configurations for the mobile applications and services are stored in the carrier application and add-on database (44). Already available layouts with embedded and configured services and applications, add-ons and widgets are also present in the carrier application and add-on database (44).

The carrier applications server (43), and thus the carrier application and add-on database (44) communicate via a link (454) using IP protocols, for example, with the carrier application and add-on studio (45).

The carrier application and add-on studio (45) is an environment with a WEB like GUI (Graphical User Interface) for creation of layouts, pages, add-ons and configurations of applications screens with applications and services to be displayed on the screen of the mobile device of the end user (114). An add-on is any complementary element which is used to enhance the service functionality and the service presentation, as for example, with graphical elements, audio-visual elements, voice elements or with functional elements as an interface to facilitate the connections with other services in a layout and to enhance the interactivity with the end user. The carrier application and add-on studio (45) communicates with the network gateway (18) via the link (458) by using IP protocol, for example, in order to extend applications and add-ons with compliant protocols. The carrier application and add-on studio (45) communicates with the network Browser (16) via the link (456) using IP protocol, for example, in order to configure applications and add-ons for required services. The carrier application and add-on studio (45) allows packaging of the service, for example, thanks to included different programming and compilation tools and technics, as a standalone carrier application and add-on client for the mobile terminal of the user (114), or as an add-on for the said client for the mobile terminal of the user (114).

The carrier application and add-on studio (45) is provided to telecommunications operators, third party services and applications providers, applications developers and others, so that they may specify and implement their own applications and services.

The carrier application and add-on studio (45) may provide layout settings, which comprise tools, rules and components to build page layouts. These layout settings are configurable via a layout editor, which is used for layout design. Layouts provide consistent aesthetics and ergonomics of the pages that will be displayed for the mobile subscribers (or end users). Layout settings comprise, for example:

Templates for color definitions, and page element styling;
  Settings for logos to be inserted in the page header;
  Configuration settings for ordering of services and bookmarks on the mobile phone screen;
  Configuration settings for advertisements and branding.

The carrier application and add-on studio (45) also performs customizable configuration for templates used for layouts, providing editing with different language strings and uploads of images.

For example, templates comprise CSS styles for displaying different page elements. Each layout has a different template, and an end user with a specific profile and tariff plan can see headers, list boxes and buttons in specific colors. Moreover, templates are editable in different languages. Addition of new languages is enabled and set up by the carrier application and add-on studio (45). Several kinds of images are uploaded and/or modified, for example, logo images, icon images, bookmark images, page images and add-on images.

Different customized layouts are also available according to end user profiles, phone numbers or other specific information related to end users. Moreover, the carrier application and add-on studio (45) may provide visual add-on settings, which comprise tools, rules and components to build add-ons. Add-ons are, for example, custom applications running and displayed on the terminal screen of the user (114). For example, a classical add-on is configured with four pages and four navigation buttons. To design add-ons, the carrier application and add-on studio (45) comprises an add-ons visual Editor which allows creation of mobile screens by dragging components from a toolbox with predefined add-ons list, into a mobile phone frame. To build add-ons, an add-ons editor module comprises different configurable components as button, checkbox, grid, line list, text box, chart, or map components for implementing drop-down menus and many other add-ons.

When applications and services menus are designed and configured by the carrier application and add-on studio (45), they are downloaded or uploaded in the carrier application and add-on client of the terminal of the subscriber (114), and are ready to be displayed on the mobile terminal screen with other applications, as selected by the subscriber (114).

Advantageously, the Multichannel Center (14) provides network services and core network services as applications to end users terminals located in the mobile telecommunications access network (113). Virtual mobile number service is an example of a core network service implemented and provided by the Multichannel Center server (14), for example, represented with an graphic icon in an application layout of the mobile device. The service virtual mobile number allows the subscriber to use multiple mobile numbers in a single SIM card without one or more additional SIM cards per phone number. Virtual mobile numbers can be temporary or permanent, with a postpaid or prepaid schedule, self-managed by the end user subscription, for activation, tuning options, renewal and deactivation. For example, when the subscriber selects an option "Activation", a ready to run service "Virtual Mobile Number" is retrieved by the SLM module (210) from the RRS module (55), and the service logic for a virtual mobile number activation is executed. This service logic may comprise, for example:

- a step of checking of the subscriber profile from a database comprised in a HLR element of the core network (130); for example, if the profile is prepaid or postpaid or mixed profile, user profiles being stocked in the database (19), for selecting and configuring related service options for each profile;
- a step of attributing a virtual mobile number, and where required, a step of registering said virtual number in appropriate core network elements;
- a step of customizing services options and messages for the subscriber.

The subscriber may then perform multiple actions, such as voice call initiation and reception, SMS, data sending and receiving by using virtual numbers associated with available service options. For example, a first subscriber (114), said A-party, initiates calls, using a virtual mobile number, to a second subscriber (115), said B-party. MO (Mobile Originating) calls and SMS-MO from a virtual mobile number of A-party may be possible using a prefix before the B-party number. When a MSC (Mobile Switching Center) element of a mobile core network (130) close to A-party detects the prefix, the Multichannel Center (14) retrieves from said MSC the originated calls to the called party which begins with the virtual number prefix. The Multichannel Center (14) then performs the appropriate tasks to call B-party without a prefix and changes a CLI (Caller Line Identity) to display a virtual mobile number of the calling A-party to the called B-party. In this case, the Multichannel Center (14) operates as a MSC in the mobile core network (130) and handles all of the actions for mobile originating calls and for mobile terminating calls. The Multichannel Center (14) also enables calls between two virtual mobile numbers, after applying a check for validity of the virtual mobile numbers for both A-party (114) and B-party (115).

In a preferred embodiment, core network services and network services are presented as add-ons in an application layout. For example, a core network service such as virtual numbers can be enabled as a Facebook® application.

In a particular embodiment, core network services and network services are presented as standalone applications. For example, a core network service such as virtual numbers can be enabled as an Android® application.

In one implementation, the service welcome menu and options is implemented by using USSD or SMS or email or other messaging protocols. In a preferred embodiment, the end user may reach network services and core networks services from the mobile telecommunication core network (130), by using USSD, IP or SIP protocol through various telecommunications channels, such as GSM, EDGE, GPRS, 3G/3G+, IMS and/or LTE for example. These services are provided by the Multichannel Center (14) to the core network (130) via different channel, for example via link (133) using SS7, MAP, CAP, INAP or ISUP protocols, via link (442) using SIP protocol, via link (446) using RTP protocol and/or via link (448) using IP, HTTP and/or data protocol.

In a particular embodiment, the carrier application server (43) sends core network services and networks services as applications and add-ons through a link (413) using IP protocols to a dedicated server in the Internet platform (11), external to the mobile telecommunications access network (113). Thus, the terminals of the users (114), (115) and (116) may reach and retrieve network services and/or core network services created in the Multichannel Center (14) through any IP network (13), by using a link such as (401) and IP protocol, directly from the Internet platform (11), without any connection to the mobile telecommunication access network (113) and to the core network (130). Then, the carrier application and add-on client embedded in the terminal of the user (114) reaches and retrieves packaged network and core network services as applications from the Internet platform (11) via a link (401) using IP protocol and WI-FI connection, for example. Thus, the exposure of network services and core network services is performed in a WEB environment.

The Multichannel Center (14) server architecture depicted in FIGS. 4, 5 and 6 presents many new features and advantages for telecommunications mobile network operators, third party services and applications providers, developers of services and applications, terminals manufacturers and end users (subscribers), such as:

- Creating, management, packaging, providing and multi-channel delivery of network services and core network services, without either software development or software compilation, by using user friendly WEB-like GUI for services creation and implementation;

Providing fast and easy exposure of network services and core network services, as multichannel communication such as mobile text messaging, voice, applications or as add-ons with visual representation, with ergonomic, interactive and attractive presentation of services for the end users;

Providing via the API gateway property, business-to-business services from telecommunications operators and third party services providers platforms to OCS (Online Charging System) platforms, BSCS (Business Support Control System) platforms, VAS, IT (Information Technology) and Internet platforms;

Providing machine-to-machine (MML) communication, for example via USSD, by allowing core network (130) equipment to interface equipment of third party services providers, MVNOs or others, through simulation of an USSD session with a mobile subscriber. This allows the integration of the core network equipment with external services and applications platforms without changing it, and thus opens the core network (130), facilitating the mobile application deployments. An example of implementation of USSD machine-to-machine communication is used by the network vendors of core network equipment. The vendors of HLR use the forward of LU (Location Update) messages over USSD, removing the need of active signaling probes and enabling affordable and faster deployment of roaming and location applications;

Providing applications-to-person services such as campaign management, voting, branding, advertisement and marketing services exposed by using USSD, SMS and/or IP channel. For example, a voting application is realized by using interactive two way SMS service (called also "iSMS");

Providing directly or as an application, services such as USSD-over-Data, USSD business-to-business-to, USSD machine-to-machine, USSD IMS and others, thanks to the multichannel delivery of services;

Providing interactive communication to end user devices delivering network services and core network services through a multitude of communications channels chosen from a group consisting of voice, text, data, USSD, WEB, video, applications, application add-ons and APIs channels;

Providing multichannel access to subscribers from digital applications stores, such as from Facebook® (free social networking website that allows registered users to create profiles, upload and share multimedia contents, as photos and video, send messages and contact other people), from WEB, USSD, SMS, IVR platforms and others;

Providing simplification of the settings for customization, subscription, charging and use or services and core network services;

Providing direct access to core network services and network services for the end user (the subscriber) via a mobile device, inside of the coverage of the mobile telecommunications access network or outside of the coverage of the mobile telecommunications access network. Thus, the device is a channel to reach and to provide network services and core network services;

Providing improvement of end user experience, network services and core network services being enabled from any entertainment interface, for example Apple® "iTunes" or Google® "Play" and others, while these network services and core network services continue to be driven by the mobile telecommunications network;

Providing compliance with applications platforms such as iOS (iPhone Operational System, which is a mobile operational system developed by Apple® and distributed exclusively for Apple® hardware), Android®, Windows Mobile®, Facebook®, HTML5 and others;

Providing thus for the end users interactivity and opportunity to reach networks services and core network services by interactive voice, text, USSD, WEB, applications, add-ons, data, API, Facebook® and other channels;

Providing opening of the telecommunications networks infrastructure to the developers of applications and services;

Providing physical, virtualized and cloud deployments;

Providing an application as a communication channel;

Providing a communication channel as an application;

Providing API gateways between heterogeneous platforms, networks and devices.

Thus, the Multichannel Center (14) proposes a reliable solution to the technical problem to be solved, that is, how to provide dynamic services and applications with dynamic and interactive contents over any communication channel and how to perform scalable customization of the services providing and delivery.

Due to the particular architecture of the Multichannel Center (14) and its specific service and channel logics, the services are conceived once, are adapted and customized accordingly over a plurality of communications channels, networks, platforms and devices. An example is when an operator adds a new service bundle for subscription, and advertises an interactive offer for subscription to this bundle with customization. Instead of developing different versions of this service for every channel, network, platform and terminal, the operator defines the service logic once and implements identic service logic with adapted channel logic by using the SCE (57). Moreover, for an attractive representation of this new service bundle for the end user, the carrier application and add on studio (45) offers a responsive design (a design aiming to provide optimal visual representation and viewing end user experience, intuitive and user friendly navigation, with adapted resizing, layout, zooming, panning, and scrolling across a wide range of user devices and equipment).

Described modules and features of the Multichannel Center (14) are non-limiting embodiments. The platform architecture is open and gives the possibility of adding additional platforms and communications channels. Thus, the problem of remaking and deploying a plurality of services and/or applications through a multitude of additional communications channels is overcome, without modifications to the telecommunications networks equipment or to protocol compliance, and without, or with few, modifications of end users equipment.

Furthermore, a specific application is provided as a communication channel for implementation of additional services and applications, called "application as a channel." For example, a carrier application and add-on client module is embedded as standalone application with a graphical icon representation in the mobile phone of the end user (114), as with other applications provided through an IP channel, for example, in an "app-store" environment. An "app-store" (or applications store) is for example an online portal embedded on a mobile terminal through which software services and applications are made available for procurement, download, use and sharing. Advantageously, inside the "carrier application and add-on client" application, the Multichannel Center (14) adds various network services and/or core network services as applications and/or as add-ons.

Another embodiment of the Application as a Channel is a dedicated standalone application, outside of the "carrier application and add-on client" application, embedded as any application in an App-Store in an Android® environment, for example. Through this standalone application, the Multichannel Center (14) provides network services and/or core network services, opening the Android® environment to additional services via various protocols and channels. Then, through this dedicated application, the terminal of the end user (114) uses multiple communications channels for network services procurement, download, use and sharing.

Preferably, other application as channel examples are social networks applications such as Skype®, Facebook®, Twitter® (free social networking microblogging service that allows registered members to broadcast short update posts called tweets), which become portals and an application environment for network and core network services.

Moreover, the Multichannel Center (14) provides a communication channel as an application, called "channel as an application." The Multichannel Center (14) exposes channels such as USSD, SMS, IVR, IP and others as standalone applications, for example, in Android® and iPhone® environments, or exposes such channels as add-ons in application, and these channels are used for network services and core networks services exposure, or for advertisement and marketing usage, for example.

What is claimed:

1. A digital telecommunications server system for creation, management and provision of services within a telecommunications network, comprising:
   a multichannel server that enables a core network of a mobile telecommunications network to deliver core network services to mobile terminals of end users through a plurality of communication channels, wherein the plurality of communication channels comprise voice, text, data, unstructured supplementary service data, web, video, application and application program interface communication channels, and wherein the multichannel server is connected through the plurality of telecommunications channels to the core network of the mobile telecommunications network, the multichannel server comprising:
   a telecommunications network browser server, wherein the telecommunications network browser server performs creation, management and provision of telecommunications network services and creation, management and provision of core telecommunications network services by performing navigation in the core telecommunications network;
   a network gateway platform that communicates with the telecommunications network browser server and exchanges data with a set of elements of the core network of the mobile telecommunications network and with a set of applications and services platforms;
   an integration gateway platform that communicates with the telecommunications network browser server and communicates with a plurality of applications and services platforms;
   a database comprising profiling information for services, and profiling and subscription information for end users, the database communicating with the telecommunications network browser server;
   a carrier application server that communicates with the telecommunications network browser server, the integration gateway platform and the network gateway platform;
   a carrier application and add-on studio platform that communicates with the carrier application server, the network browser server, the integration gateway platform and the network gateway platform;
   wherein the multichannel server provides to end user devices network services and core network services through another plurality of communications channels.

2. A digital telecommunications server system for creation, management and provision of services within a telecommunications network according to claim 1, wherein said network browser server comprises:
   a sub-browser server based on a language structured by objects for services creation, monitoring, orchestration and integration;
   a server with a database that stores ready to run services;
   a connector platform comprising a renderer sub-platform that performs content and format adaptations for services exposure;
   a service and logic management platform that provides and manages services, service logic creation and channel logic creation, and controls and configures the network gateway platform, the integration gateway platform, the carrier application server and the carrier application and add-on studio platform, and comprises a service creation environment platform, a business configuration platform, a subscription platform and a self-learning platform; and wherein the service and logic management platform performs service logic and channel logic, runs the service logic into the network browser server and deploys the channel logic into the integration gateway platform, the network gateway platform and the network browser server.

3. A digital telecommunications server system for creation, management and provision of services within a telecommunications network according to claim 1, wherein the network gateway platform and the integration gateway platform run channel logic.

4. A digital telecommunications server system for creation, management and provision of services within a telecommunications network according to claim 2, wherein the network gateway platform and the integration gateway platform run channel logic.

5. A digital telecommunications server system for creation, management and provision of services within a telecommunications network according to claim 2, wherein said service creation environment platform comprises a platform for main processing, a platform for preprocessing and a platform for post-processing of the service logic and of the channel logic.

6. A digital telecommunications server system for creation, management and provision of services within a telecommunications network according to claim 1, wherein the carrier application server performs services retrieval, execution, adaptation and delivery.

7. A digital telecommunications server system for creation, management and provision of services within a telecommunications network according to claim 1, wherein the carrier application server comprises a carrier application and add-on database that comprises graphics, textual and interactive components that provides means for visual and interactive representations of network services and core network services.

8. A digital telecommunications server system for creation, management and provision of services within a telecommunications network according to claim 1, wherein the carrier application and add-on studio platform performs interactive visual representations of said network services and core network services as applications and as add-ons.

9. A digital telecommunications server system for creation, management and provision of services within a telecommunications network according to claim 1, wherein the carrier application and add-on studio communicates with the carrier application and add-on database of the carrier application server and provides responsive design for services representations in the end user devices.

10. A digital telecommunications server system for creation, management and provision of services within a telecommunications network according to claim 1, wherein a network service and a core network service is provided as a standalone application from the mobile telecommunication network to end user devices.

11. A digital telecommunications server system for creation, management and provision of services within a telecommunications network according to claim 1, wherein a network service and a core network service is provided as an add-on in an application layout from the mobile telecommunication network to end user devices.

12. A digital telecommunications server system for creation, management and provision of services within a telecommunications network according to claim 1, wherein a network service and a core network service is provided to end user devices as a standalone application or as add-on in an application layout from a telecommunications network which is different from the mobile telecommunication network.

13. A digital telecommunications server system for creation, management and provision of services within a telecommunications network according to claim 1, wherein an application is provided as a communication channel to mobile telecommunications devices of end users for access and for use of network services and core network services.

14. A digital telecommunications server system for creation, management and provision of services within a telecommunications network according to claim 1, wherein a communication channel is provided as an application to mobile telecommunications devices of end users for access and for use of network services and core network services.

15. A digital telecommunications server system for creation, management and provision of services within a telecommunications network according to claim 1, wherein network services and core network services are exposed in a WEB environment and in a social network environment.

16. A digital telecommunications server system for creation, management and provision of services within a telecommunications network according to claim 1, wherein the multichannel server is an application interface gateway for services exposure from a services and applications platform of a telecommunications operator to devices of end users.

17. A digital telecommunications server system for creation, management and provision of services within a telecommunications network according to claim 1, wherein the multichannel server is an application interface gateway for services exposure from a services and applications platform of a third party services and applications provider to devices of end users.

18. A digital telecommunications server system for creation, management and provision of services within a telecommunications network according to claim 1, wherein the multichannel server is an application interface gateway for services exposure from a services and applications platform of a third party services and applications provider to a services and applications platform of a telecommunications operator.

19. A digital telecommunications server system for creation, management and provision of services within a telecommunications network according to claim 1, wherein core network services are chosen from a group consisting of: native services provided by a core network of a mobile telecommunications network related to call control; switching based on call signaling processing; authentication; charging; aggregation of flows processed by the core network; gateways for the core network that access other networks; support of operations support systems; support of business support systems; support of online charging systems; configuration and provision of core network elements; support of intelligent networks; billing; reverse billing; host and maintenance of subscribers databases; complex services provided by a core network of a mobile telecommunications network related to complex call control; services control points; complex charging and billing; virtual services for calling; call completion; call screening and filtering; campaigns management; recharge services; multi subscriber identity modules management; mobile virtual private number; new mobile number attribution; subscription management; virtual mobile numbers management; cells broadcasting of services; services management in roaming; location services based on cells identification; real-time management and renewal of exhausted data plan; and network services are chosen from a group consisting of: value added services of telecommunications operators and of third parties; call control services; customization services; services provided from applications and services delivery platforms; and Internet services.

20. A digital telecommunications server system for creation, management and provision of services within a telecommunications network according to claim 1, wherein the plurality of communications channels is chosen from a group consisting of voice, text, data, unstructured supplementary service data, WEB, applications, application add-ons and application programming interface channels.

* * * * *